US011772449B2

(12) United States Patent
Ishizeki

(10) Patent No.: US 11,772,449 B2
(45) Date of Patent: Oct. 3, 2023

(54) VEHICLE AIR CONDITIONING DEVICE

(71) Applicant: SANDEN AUTOMOTIVE CLIMATE SYSTEMS CORPORATION, Isesaki (JP)

(72) Inventor: Tetsuya Ishizeki, Isesaki (JP)

(73) Assignee: SANDEN CORPORATION, Gunma (JP)

( * ) Notice: Subject to any disclaimer, the term of this patent is extended or adjusted under 35 U.S.C. 154(b) by 313 days.

(21) Appl. No.: 17/266,713

(22) PCT Filed: Jul. 4, 2019

(86) PCT No.: PCT/JP2019/026548
§ 371 (c)(1),
(2) Date: Feb. 8, 2021

(87) PCT Pub. No.: WO2020/031569
PCT Pub. Date: Feb. 13, 2020

(65) Prior Publication Data
US 2021/0309070 A1     Oct. 7, 2021

(30) Foreign Application Priority Data
Aug. 10, 2018  (JP) .................................. 2018-151466

(51) Int. Cl.
F25D 23/12      (2006.01)
B60H 1/00       (2006.01)
B60H 1/32       (2006.01)

(52) U.S. Cl.
CPC ....... B60H 1/00278 (2013.01); B60H 1/3205 (2013.01); B60H 1/32011 (2019.05); B60H 1/32281 (2019.05); B60H 2001/00307 (2013.01)

(58) Field of Classification Search
CPC ............ B60H 1/00278; B60H 1/32281; B60H 1/32011; B60H 1/3205; B60H 2001/00307
(Continued)

(56) References Cited

U.S. PATENT DOCUMENTS 9,895,956 B2   2/2018 Satou et al.
10,052,937 B2  8/2018 Satou et al.
(Continued)

FOREIGN PATENT DOCUMENTS

DE   11 2012 003 314 T5   4/2014
DE   11 2013 004 227 T5   6/2015
(Continued)

OTHER PUBLICATIONS

International Search Report dated Aug. 27, 2019 issued in Patent Application No. PCT/JP2019/026548.
(Continued)

Primary Examiner — Davis D Hwu
(74) Attorney, Agent, or Firm — Pearne & Gordon, LLP

(57) ABSTRACT

To provide a vehicle air conditioning apparatus capable of smoothly performing temperature adjustment of a battery and a temperature-adjusted object other than the battery that are mounted on a vehicle. A vehicle air conditioning apparatus includes an equipment temperature adjusting device 61 for circulating a heating medium to a battery 55 and a traveling motor 65 to adjust the temperature of the battery 55 and the temperature of the traveling motor 65. The equipment temperature adjusting device includes circulating pumps 62, 63, and 87 for circulating the heating medium to the battery and the temperature-adjusted object, a refrigerant-heating medium heat exchanger 64 for exchanging heat between a refrigerant and the heating medium, an air-heating medium heat exchanger 67 for exchanging heat between
(Continued)

outdoor air and the heating medium, and three-way valves 81 to 83 for controlling circulation of the heating medium to the battery and the traveling motor.

3 Claims, 9 Drawing Sheets

(58) Field of Classification Search
USPC .......................................................... 62/259.2
See application file for complete search history.

(56) References Cited

U.S. PATENT DOCUMENTS

| | | |
|---|---|---|
| 2012/0253573 A1 | 10/2012 | Shigyo |
| 2013/0319029 A1 | 12/2013 | Sekiya et al. |
| 2014/0102666 A1 | 4/2014 | Ichishi et al. |
| 2015/0151609 A1 | 6/2015 | Satou et al. |
| 2015/0217622 A1 | 8/2015 | Enomoto et al. |
| 2016/0107508 A1* | 4/2016 | Johnston ............ B60H 1/00278 237/12.3 A |
| 2016/0185185 A1 | 6/2016 | Suzuki et al. |
| 2017/0297415 A1 | 10/2017 | Satou et al. |

FOREIGN PATENT DOCUMENTS

| | | | |
|---|---|---|---|
| JP | 2012-201295 A | | 10/2012 |
| JP | 2013-035406 A | | 2/2013 |
| JP | 2013-154753 A | | 8/2013 |
| JP | 2013-180723 A | | 9/2013 |
| JP | 2013-256230 A | | 12/2013 |
| JP | 5440426 B2 | | 3/2014 |
| JP | 2014-213765 A | | 11/2014 |
| JP | 2017154522 A | * | 9/2017 |
| WO | 2012-114447 A1 | | 8/2012 |
| WO | 2014-034061 A1 | | 3/2014 |

OTHER PUBLICATIONS

Japanese Office Action dated Mar. 29, 2022 (issued on Mar. 23, 2022) for the corresponding Japanese Patent Application No. 2018-151466.
Office Action dated May 5, 2023 for the corresponding German Patent Application No. 112019004021.9 with Partial English Translation.

* cited by examiner

VEHICLE AIR CONDITIONING DEVICE

TECHNICAL FIELD

The present invention relates to a heat pump type vehicle air conditioning apparatus.

BACKGROUND ART

Actualization of environmental problems in recent years has resulted in widespread use of vehicles such as hybrid vehicles and electric vehicles. Such a vehicle drives a traveling motor with power supplied from a battery mounted on the vehicle. Further, as an air conditioning apparatus applicable to such a vehicle, there has been developed an air conditioning apparatus that includes a refrigerant circuit in which a compressor, a radiator, a heat absorber, and an outdoor heat exchanger are connected, and heats inside of a cabin by causing a refrigerant discharged from the compressor to dissipate heat in the radiator and causing the refrigerant that has dissipated heat in the radiator to absorb heat in the outdoor heat exchanger and cools the inside of the cabin by causing the refrigerant discharged from the compressor to dissipate heat in the outdoor heat exchanger and causing the refrigerant to absorb heat in the heat absorber (e.g., refer to Patent Literature 1).

On the other hand, the charge and discharge performance of the battery is reduced under a low temperature environment. In addition, if the charge and discharge of the battery are performed under an environment where the temperature is high due to, for example, self-heating, there is also a risk that deterioration thereof may progress and the battery may cause an operation failure and lead to breakage in the end. Thus, there has also been developed a technique capable of adjusting the temperature of a battery by circulating, to the battery, cooling water (heating medium) that exchanges heat with a refrigerant circulating through a refrigerant circuit (e.g., refer to Patent Literature 2).

CITATION LIST

Patent Literature

Patent Literature 1: JP-A-2014-213765
Patent Literature 2: Japanese Patent No. 5440426

SUMMARY OF THE INVENTION

Problems to be Solved by the Invention

Cooling the battery as described above makes it possible to recover waste heat of the battery into the refrigerant through the cooling water so as to allow the waste heat to contribute to heating inside the cabin while preventing deterioration of the battery caused by abnormally high temperature. However, under a low outdoor air temperature environment, for example, in winter when heating inside the cabin is required, the temperature of the battery is less likely to increase, and the necessity of cooling the battery is thus low. Instead, cooling the battery may cause the risk of making the battery temperature too low and reducing the performance, and a waste heat recovery effect cannot be expected much.

On the other hand, the above-mentioned traveling motor and the like (temperature-adjusted objects other than the battery) are also mounted on the vehicle in addition to the battery, and the traveling motor and the like also generate heat by being driven. Thus, cooling is required for stable operation. Further, the traveling motor and the like can be driven at a lower temperature than the battery.

The present invention has been made to solve the known technical problems described above, and an object thereof is to provide a vehicle air conditioning apparatus capable of smoothly performing temperature adjustment of a battery and a temperature-adjusted object other than the battery that are mounted on a vehicle.

Solution to the Problems

A vehicle air conditioning apparatus of an embodiment of the present invention is a vehicle air conditioning apparatus for air-conditioning inside of a cabin, the vehicle air conditioning apparatus including: a compressor for compressing a refrigerant; a radiator for causing the refrigerant to dissipate heat to heat air to be supplied into the cabin; a heat absorber for causing the refrigerant to absorb heat to cool air to be supplied into the cabin; an outdoor heat exchanger provided outside the cabin; a control device; and an equipment temperature adjusting device for circulating a heating medium to a battery and a predetermined temperature-adjusted object other than the battery, the battery and the temperature-adjusted object being mounted on a vehicle, to adjust a temperature of the battery and a temperature of the temperature-adjusted object, in which the equipment temperature adjusting device includes: a circulating device for circulating the heating medium to the battery and the temperature-adjusted object; a refrigerant-heating medium heat exchanger for exchanging heat between the refrigerant and the heating medium to cause the refrigerant to absorb heat from the heating medium; an air-heating medium heat exchanger for exchanging heat between outdoor air and the heating medium; and a flow passage switching device for controlling circulation of the heating medium to the battery and the temperature-adjusted object.

According to a second embodiment of the invention, preferably, in the vehicle air conditioning apparatus according to the above embodiment, the air-heating medium heat exchanger is disposed on a leeward side of the outdoor heat exchanger.

According to a third embodiment of the invention, preferably, in the vehicle air conditioning apparatus according to each of the above embodiments, the control device is capable of executing a first flow passage control state for circulating the heating medium flowing out of the refrigerant-heating medium heat exchanger to the temperature-adjusted object without circulating the heating medium to the battery and a second flow passage control state for circulating the heating medium between the battery and the refrigerant-heating medium heat exchanger and circulating the heating medium between the temperature-adjusted object and the air-heating medium heat exchanger in a switching manner by controlling the circulating device and the flow passage switching device.

According to a fourth embodiment of the invention, preferably, in the vehicle air conditioning apparatus according to the third embodiments, the equipment temperature adjusting device includes a heating device for heating the heating medium, and the control device is capable of executing a third flow passage control state for circulating the heating medium between the battery and the heating device and circulating the heating medium between the temperature-adjusted object and the refrigerant-heating medium heat exchanger in a switching manner by using the circulating device and the flow passage switching device.

According to a fifth embodiment of the invention, preferably, in the vehicle air conditioning apparatus according to each of the above embodiments, the control device is capable of executing at least an air conditioning operation for heating the inside of the cabin by causing the refrigerant discharged from the compressor to dissipate heat in the radiator, decompressing the refrigerant heat-dissipated, and then causing the refrigerant to absorb heat in the outdoor heat exchanger and an air conditioning operation for cooling the inside of the cabin by causing the refrigerant discharged from the compressor to dissipate heat in the outdoor heat exchanger, decompressing the refrigerant heat-dissipated, and then causing the refrigerant to absorb heat in the heat absorber in a switching manner, and the control device is capable of decompressing the refrigerant and then passing the refrigerant to the refrigerant-heating medium heat exchanger to cause the refrigerant to absorb heat from the heating medium in each of the air conditioning operations.

Effects of the Invention

According to the present invention, the vehicle air conditioning apparatus for air-conditioning inside of a cabin includes: a compressor for compressing a refrigerant; a radiator for causing the refrigerant to dissipate heat to heat air to be supplied into the cabin; a heat absorber for causing the refrigerant to absorb heat to cool air to be supplied into the cabin; an outdoor heat exchanger provided outside the cabin; a control device; and an equipment temperature adjusting device for circulating a heating medium to a battery and a predetermined temperature-adjusted object other than the battery, the battery and the temperature-adjusted object being mounted on a vehicle, to adjust a temperature of the battery and a temperature of the temperature-adjusted object, in which the equipment temperature adjusting device includes: a circulating device for circulating the heating medium to the battery and the temperature-adjusted object; a refrigerant-heating medium heat exchanger for exchanging heat between the refrigerant and the heating medium to cause the refrigerant to absorb heat from the heating medium; an air-heating medium heat exchanger for exchanging heat between outdoor air and the heating medium; and a flow passage switching device for controlling circulation of the heating medium to the battery and the temperature-adjusted object. This makes it possible to cool, in various manners, the battery and the temperature-adjusted object other than the battery, the battery and the temperature-adjusted object being mounted on the vehicle, using the heating medium cooled by the refrigerant in the refrigerant-heating medium heat exchanger and the heating medium cooled by outdoor air in the air-heating medium heat exchanger by the control device controlling the circulating device and the flow passage switching device, which results in enhanced convenience.

For example, as in the third embodiment of the invention, the control device may be capable of executing a first flow passage control state for circulating the heating medium flowing out of the refrigerant-heating medium heat exchanger to the temperature-adjusted object without circulating the heating medium to the battery and a second flow passage control state for circulating the heating medium between the battery and the refrigerant-heating medium heat exchanger and circulating the heating medium between the temperature-adjusted object and the air-heating medium heat exchanger in a switching manner by controlling the circulating device and the flow passage switching device. This makes it possible to perform heating inside the cabin as in the fifth embodiment of the invention while recovering heat of the temperature-adjusted object other than the battery, the temperature-adjusted object being mounted on the vehicle, into the refrigerant and cooling the temperature-adjusted object without cooling the battery in the first flow passage control state.

Consequently, when heating inside the cabin is performed, it is possible to efficiently perform the heating inside the cabin by effectively using heat of the temperature-adjusted object other than the battery, and cool the temperature-adjusted object while reducing frost formation on the outdoor heat exchanger. At this time, the battery is not cooled. Thus, it is also possible to avoid, in advance, an adverse effect on the battery under an environment where cooling of the battery is not required, for example, when the outdoor air temperature is particularly low.

On the other hand, in the second flow passage control state, the heating medium flowing out of the refrigerant-heating medium heat exchanger is circulated to the battery to cool the battery, and the heating medium is circulated between the temperature-adjusted object and the air-heating medium heat exchanger to cool the temperature-adjusted object. This makes it possible to more smoothly cool the temperature-adjusted object other than the battery using outdoor air while cooling the battery using the refrigerant when cooling inside the cabin as in the fifth embodiment of the invention is performed. Thus, it is possible to, under the environment where the outdoor air temperature is high, cool both the battery and the temperature-adjusted object to avoid reduction in performance.

In this case, as in the second embodiment of the invention, the air-heating medium heat exchanger may be disposed on a leeward side of the outdoor heat exchanger. This makes it also possible to avoid the inconvenience of the air-heating medium heat exchanger interfering with the heat dissipation action of the outdoor heat exchanger.

Further, as in the fourth embodiment of the invention, the equipment temperature adjusting device may include a heating device for heating the heating medium, and the control device may be capable of executing a third flow passage control state for circulating the heating medium between the battery and the heating device and circulating the heating medium between the temperature-adjusted object and the refrigerant-heating medium heat exchanger in a switching manner by using the circulating device and the flow passage switching device. This makes it also possible to, in particular, under the low outdoor air temperature environment, eliminate the inconvenience of reduction in performance caused by excessive decrease in the temperature of the battery while cooling the temperature-adjusted object using the refrigerant and recovering waste heat thereof and heating the battery using the heating device.

DESCRIPTION OF THE EMBODIMENTS

Hereinbelow, embodiments of the present invention will be described in detail with reference to the drawings.

First Embodiment

Figure 1:
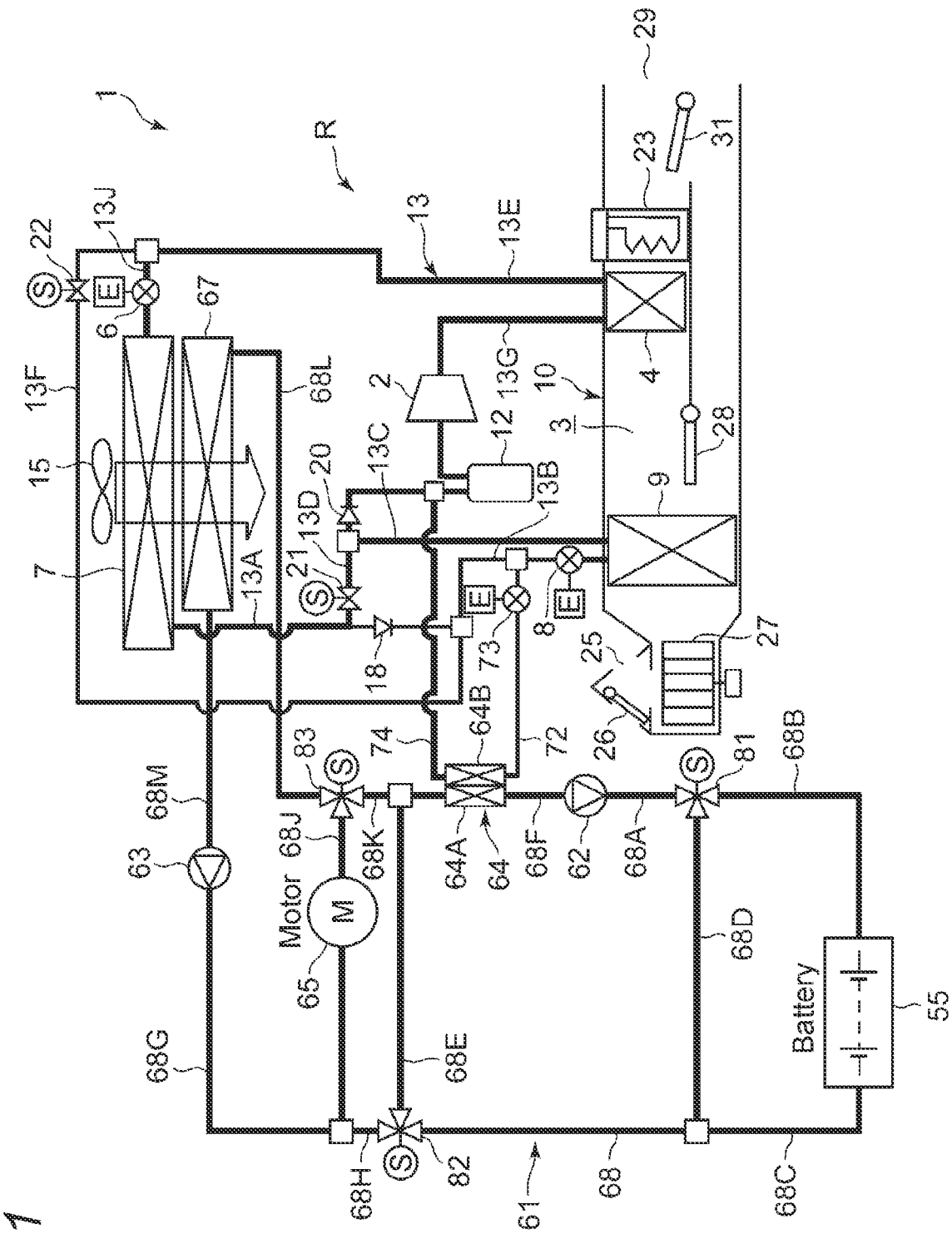
FIG. 1 is a configuration diagram of an embodiment of a vehicle air conditioning apparatus to which the present invention is applied (first embodiment).

FIG. 1 is a configuration diagram of a vehicle air conditioning apparatus 1 of an embodiment to which the present invention is applied. A vehicle of the embodiment to which the present invention is applied is an electric vehicle (EV) that is equipped with no engine (internal combustion engine), but equipped with a battery 55 (e.g., a lithium battery) and driven to run by supplying, to a traveling motor (electric motor) 65, power charged in the battery 55 from an external power supply. Further, the vehicle air conditioning apparatus 1 is also driven with the power supplied from the battery 55.

That is, in the electric vehicle that is not capable of performing heating using engine waste heat, the vehicle air conditioning apparatus 1 performs a heating operation through a heat pump operation using a refrigerant circuit R, and further selectively executes air-conditioning operations including a dehumidifying and heating operation, a dehumidifying and cooling operation, and a cooling operation to perform air conditioning inside a cabin.

Note that the heating operation and the dehumidifying and heating operation described above correspond to an air conditioning operation for heating inside of the cabin in the present invention, and the cooling operation and the dehumidifying and cooling operation described above correspond to an air conditioning operation for cooling the inside of the cabin in the present invention. Further, it is needless to say that the vehicle is not limited to the electric vehicle, and the present invention is also effective for a so-called hybrid vehicle using an engine and an electric motor for traveling in combination.

The vehicle air conditioning apparatus 1 of the embodiment performs air conditioning (heating, cooling, dehumidification, and ventilation) inside the cabin of the electric vehicle, and includes a motor-operated type compressor (motor-operated compressor) 2 that compresses a refrigerant, a radiator 4 for causing the high-temperature and high-pressure refrigerant discharged from the compressor 2 and flowing into the radiator 4 through a refrigerant pipe 13G to dissipate heat to heat air to be supplied into the cabin, the radiator 4 being provided inside an air flow passage 3 of an HVAC unit 10 in which air inside the cabin is ventilated and circulated, an outdoor expansion valve 6 including a motor-operated valve that decompresses and expands the refrigerant in heating, an outdoor heat exchanger 7 for exchanging heat between the refrigerant and outdoor air to function as a radiator (condenser) that causes the refrigerant to dissipate heat in cooling and to function as an evaporator that causes the refrigerant to absorb heat in heating, an indoor expansion valve 8 including a motor-operated valve that decompresses and expands the refrigerant, a heat absorber 9 for causing the refrigerant to absorb heat from the inside and outside of the cabin to cool air to be supplied into the cabin in cooling (dehumidification), the heat absorber 9 being provided inside the air flow passage 3, an accumulator 12, and the like, these components being sequentially connected through a refrigerant pipe 13 to constitute the refrigerant circuit R. The outdoor expansion valve 6 and the indoor expansion valve 8 decompress and expand the refrigerant and can also be fully open or closed.

Note that the outdoor heat exchanger 7 is provided with an outdoor blower 15. The outdoor blower 15 forcibly passes outdoor air to the outdoor heat exchanger 7 to exchange heat between the outdoor air and the refrigerant, thereby passing outdoor air to the outdoor heat exchanger 7 even during a stop of the vehicle (that is, when a vehicle speed is 0 km/h).

Further, a refrigerant pipe 13A connected to a refrigerant outlet side of the outdoor heat exchanger 7 is connected to a refrigerant pipe 13B via a check valve 18. Note that the check valve 18 has its forward direction toward the refrigerant pipe 13B. The refrigerant pipe 13B is connected to the indoor expansion valve 8.

Further, a refrigerant pipe 13D branches off from the refrigerant pipe 13A extending from the outdoor heat exchanger 7 and is connected, in communication, to a refrigerant pipe 13C located on an outlet side of the heat absorber 9 via a solenoid valve 21 that is open in heating. Further, a check valve 20 is connected to the refrigerant pipe 13C on a downstream side relative to a connection point connected with the refrigerant pipe 13D, the refrigerant pipe 13C is connected to the accumulator 12 on the downstream side relative to the check valve 20, and the accumulator 12 is connected to a refrigerant suction side of the compressor 2. Note that the check valve 20 has its forward direction toward the accumulator 12.

Further, a refrigerant pipe 13E on an outlet side of the radiator 4 branches to a refrigerant pipe 13J and a refrigerant pipe 13F before the outdoor expansion valve 6 (on a refrigerant upstream side of the outdoor expansion valve 6). The refrigerant pipe 13J, which is one of the branching refrigerant pipes, is connected to a refrigerant inlet side of the outdoor heat exchanger 7 via the outdoor expansion valve 6. Further, the refrigerant pipe 13F, which is the other of the branching refrigerant pipes, is connected, in communication, to the refrigerant pipe 13B located on the refrigerant downstream side of the check valve 18 and on the refrigerant upstream side of the indoor expansion valve 8 via a solenoid valve 22 that is open in dehumidification.

Consequently, the refrigerant pipe 13F is connected in parallel to a series circuit of the outdoor expansion valve 6, the outdoor heat exchanger 7, and the check valve 18, and serves as a circuit that bypasses the outdoor expansion valve 6, the outdoor heat exchanger 7, and the check valve 18.

Further, in the air flow passage 3 on an air upstream side of the heat absorber 9, suction ports including an outdoor air suction port and an indoor air suction port are formed (represented by a suction port 25 in FIG. 1), and a suction switching damper 26 is provided at the suction port 25. The suction switching damper 26 switches air to be introduced into the air flow passage 3 between indoor air that is air inside the cabin (indoor air circulation) and outdoor air that is air outside the cabin (outdoor air introduction). Furthermore, an indoor blower (blower fan) 27 for supplying the introduced indoor or outdoor air to the air flow passage 3 is provided on an air downstream side of the suction switching damper 26.

Further, in FIG. 1, a reference numeral 23 denotes an auxiliary heater as an auxiliary heating device. The auxiliary heater 23 includes a PTC heater (electric heater) in the embodiment and is provided inside the air flow passage 3 on the air downstream side of the radiator 4 in an air flow in the air flow passage 3. Further, when the auxiliary heater 23 generates heat by being energized, the auxiliary heater 23 serves as a so-called heater core and complements heating inside the cabin.

Further, inside the air flow passage 3 on the air upstream side of the radiator 4, an air mix damper 28 is provided. The air mix damper 28 adjusts a proportion by which air inside the air flow passage 3 (the indoor or outdoor air) that has flowed into the air flow passage 3 and passed through the heat absorber 9 is to be passed to the radiator 4 and the auxiliary heater 23. Furthermore, in the air flow passage 3 on the air downstream side of the radiator 4, blowoff ports including FOOT, VENT and DEF (represented by a blowoff port 29 in FIG. 1) are formed, and a blowoff port switching damper 31 is provided at the blowoff port 29. The blowoff port switching damper 31 performs switching control of blowoff of air through each of the blowoff ports described above.

The vehicle air conditioning apparatus 1 further includes an equipment temperature adjusting device 61 for adjusting a temperature of the battery 55 and a temperature of the traveling motor 65 by circulating a heating medium to the battery 55 and the traveling motor 65. That is, in the embodiment, the traveling motor 65 corresponds to a predetermined temperature-adjusted object other than the battery 55, the temperature-adjusted object being mounted on the vehicle. Note that the traveling motor 65 as the temperature-adjusted object in the present invention is not limited to the electric motor itself, but is a concept also including electric equipment such as an inverter circuit for driving the electric motor. Further, it is needless to say that equipment that is mounted on the vehicle and generates heat other than the traveling motor 65 is applicable to the temperature-adjusted object.

The equipment temperature adjusting device 61 of the embodiment includes a first circulating pump 62 and a second circulating pump 63 as a circulating device for circulating the heating medium to the battery 55 and the traveling motor 65, a refrigerant-heating medium heat exchanger 64, an air-heating medium heat exchanger 67, and a first three-way valve 81, a second three-way valve 82, and a third three-way valve 83 as a flow passage switching device, and these components, the battery 55, and the traveling motor 65 are connected through a heating medium pipe 68.

In the case of this embodiment, a heating medium pipe 68A is connected to a discharge side of the first circulating pump 62 and also connected to an inlet of the first three-way valve 81. One outlet of the first three-way valve 81 is connected to a heating medium pipe 68B, and the heating medium pipe 68B is connected to an inlet of the battery 55. An outlet of the battery 55 is connected to a heating medium pipe 68C, and the heating medium pipe 68C is connected to an inlet of the second three-way valve 82. The other outlet of the first three-way valve 81 is connected to a heating medium pipe 68D, and the heating medium pipe 68D is connected, in communication, to the heating medium pipe 68C between the battery 55 and the second three-way valve 82. Thus, the heating medium pipe 68D bypasses the battery 55.

Further, one outlet of the second three-way valve 82 is connected to a heating medium pipe 68E, and the heating medium pipe 68E is connected to an inlet of a heating medium flow passage 64A of the refrigerant-heating medium heat exchanger 64. Further, a heating medium pipe 68F is connected to an outlet of the heating medium flow passage 64A, and the heating medium pipe 68F is connected to a suction side of the first circulating pump 62.

On the other hand, a heating medium pipe 68G is connected to a discharge side of the second circulating pump 63 and also connected to an inlet of the traveling motor 65. Note that the other outlet of the second three-way valve 82 is connected to the heating medium pipe 68H, and the heating medium pipe 68H is connected, in communication, to the heating medium pipe 68G between the second circulating pump 63 and the traveling motor 65. Further, an outlet of the traveling motor 65 is connected to a heating medium pipe 68J, and the heating medium pipe 68J is connected to an inlet of the third three-way valve 83.

One outlet of the third three-way valve 83 is connected to a heating medium pipe 68K, and the heating medium pipe 68K is connected, in communication, to the heating medium pipe 68E between the second three-way valve 82 and the refrigerant-heating medium heat exchanger 64. Further, the other outlet of the third three-way valve 83 is connected to a heating medium pipe 68L, and the heating medium pipe 68L is connected to an inlet of the air-heating medium heat exchanger 67. Further, a heating medium pipe 68M is connected to an outlet of the air-heating medium heat exchanger 67 and also connected to a suction side of the second circulating pump 63.

As the heating medium used in the equipment temperature adjusting device 61, for example, water, a refrigerant such as HFO-1234yf, liquid such as a coolant, or gas such as air can be employed. Note that, in the embodiment, water is employed as the heating medium. Further, for example, a jacket structure capable of circulating therethrough the heating medium in a heat exchange relation with the battery 55 or the traveling motor 65 is provided around each of the battery 55 and the traveling motor 65. Further, the air-heating medium heat exchanger 67 is disposed on a leeward side of the outdoor heat exchanger 7 in a flow (air passage) of outdoor air (air) passed by the outdoor blower 15.

Further, when the first circulating pump 62 is operated with the first three-way valve 81 switched to a state where the inlet and the other outlet communicate with each other, the second three-way valve 82 switched to a state where the inlet and the other outlet communicate with each other, and the third three-way valve 83 switched to a state where the inlet and the one outlet communicate with each other, the heating medium discharged from the first circulating pump 62 flows through the heating medium pipe 68A, the first three-way valve 81, the heating medium pipe 68D, the heating medium pipe 68C, the second three-way valve 82, the heating medium pipe 68H, the heating medium pipe 68G, the traveling motor 65, the heating medium pipe 68J, the third three-way valve 83, the heating medium pipe 68K, the heating medium pipe 68E, the heating medium flow passage 64A of the refrigerant-heating medium heat exchanger 64, and the heating medium pipe 68F in this order, and is sucked into the first circulating pump 62, thereby performing circulation. This is defined as a first flow passage control state.

In the first flow passage control state, as described later, the heating medium cooled by the refrigerant absorbing heat from the heating medium in the heating medium flow passage 64A of the refrigerant-heating medium heat exchanger 64 is circulated to the traveling motor 65 and exchanges heat with the traveling motor 65 to recover waste heat from the traveling motor 65, and the traveling motor 65 itself is cooled. On the other hand, since the heating medium is not circulated to the battery 55, the battery 55 is not cooled by the heating medium.

Next, when the first circulating pump 62 and the second circulating pump 63 are operated with the first three-way valve 81 switched to a state where the inlet and the one outlet communicate with each other, the second three-way valve 82 switched to a state where the inlet and the one outlet communicate with each other, and the third three-way valve 83 switched to a state where the inlet and the other outlet communicate with each other, the heating medium discharged from the first circulating pump 62 flows through the heating medium pipe 68A, the first three-way valve 81, the heating medium pipe 68B, the battery 55, the heating medium pipe 68C, the second three-way valve 82, the heating medium pipe 68E, the heating medium flow passage 64A of the refrigerant-heating medium heat exchanger 64, and the heating medium pipe 68F in this order, and is sucked into the first circulating pump 62. On the other hand, the heating medium discharged from the second circulating pump 63 flows through the heating medium pipe 68G, the traveling motor 65, the heating medium pipe 68J, the third three-way valve 83, the heating medium pipe 68L, the air-heating medium heat exchanger 67, and the heating medium pipe 68M in this order, and is sucked into the second circulating pump 63, thereby performing circulation. This is defined as a second flow passage control state.

In the second flow passage control state, the heating medium is circulated between the battery 55 and the refrigerant-heating medium heat exchanger 64. Thus, as described later, the heating medium cooled by the refrigerant absorbing heat from the heating medium in the heating medium flow passage 64A of the refrigerant-heating medium heat exchanger 64 is circulated to the battery 55 and exchanges heat with the battery 55 to cool the battery 55. Further, the heating medium is circulated between the traveling motor 65 and the air-heating medium heat exchanger 67. Thus, the heating medium cooled by outdoor air (air-cooled) in the air-heating medium heat exchanger 67 is circulated to the traveling motor 65 and exchanges heat with the traveling motor 65 to cool the traveling motor 65.

On the other hand, one end of a branch pipe 72 as a branch circuit is connected to the refrigerant pipe 13B located on the refrigerant downstream side of the outlet of the refrigerant pipe 13F of the refrigerant circuit R, that is, a connection part between the refrigerant pipe 13F and the refrigerant pipe 13B and on the refrigerant upstream side of the indoor expansion valve 8. The branch pipe 72 is provided with an auxiliary expansion valve 73 including a motor-operated valve. The auxiliary expansion valve 73 decompresses and expands the refrigerant flowing into a refrigerant flow passage 64B (described later) of the refrigerant-heating medium heat exchanger 64 and can also be fully closed.

Further, the other end of the branch pipe 72 is connected to the refrigerant flow passage 64B of the refrigerant-heating medium heat exchanger 64. One end of a refrigerant pipe 74 is connected to an outlet of the refrigerant flow passage 64B, and the other end of the refrigerant pipe 74 is connected to the refrigerant pipe 13C on the refrigerant downstream side of the check valve 20 and before the accumulator 12 (on the refrigerant upstream side of the accumulator 12). Further, the auxiliary expansion valve 73 and the like also constitute a part of the refrigerant circuit R, and, at the same time, also constitute a part of the equipment temperature adjusting device 61.

When the auxiliary expansion valve 73 is open, the refrigerant (a part of or all the refrigerant) flowing out of the refrigerant pipe 13F and the outdoor heat exchanger 7 flows into the branch pipe 72 and is decompressed by the auxiliary expansion valve 73, and then flows into the refrigerant flow passage 64B of the refrigerant-heating medium heat exchanger 64 and evaporates therein. The refrigerant absorbs heat from the heating medium flowing through the heating medium flow passage 64A in the process of flowing through the refrigerant flow passage 64B and is then sucked into the compressor 2 through the accumulator 12.

Figure 2:
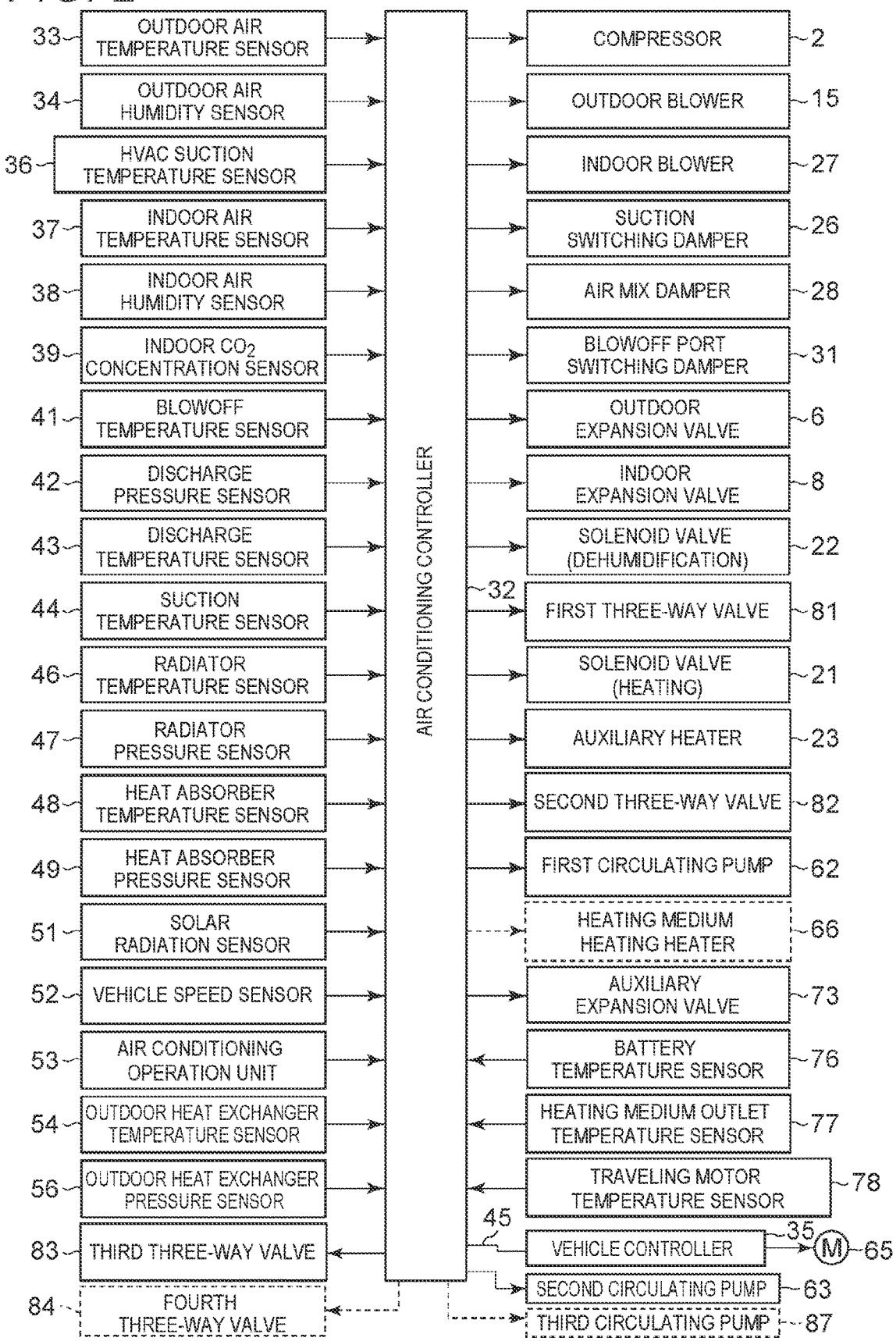
FIG. 2 is a block diagram of an air conditioning controller as a control device of the vehicle air conditioning apparatus of FIG. 1.

Next, a reference numeral 32 in FIG. 2 denotes an air conditioning controller 32 as a control device that performs control of the vehicle air conditioning apparatus 1. The air conditioning controller 32 is connected, via the vehicle communication bus 45, to a vehicle controller 35 (ECU) that performs control of the entire vehicle including driving control for the traveling motor 65 and charge and discharge control for the battery 55 and configured to perform transmission and reception of information. Each of the air conditioning controller 32 and the vehicle controller 35 (ECU) includes a microcomputer as an example of a computer provided with a processor.

Respective outputs of an outdoor air temperature sensor 33 that detects an outdoor air temperature (Tam) of the vehicle, an outdoor air humidity sensor 34 that detects an outdoor air humidity, an HVAC suction temperature sensor 36 that detects a temperature of air sucked into the air flow passage 3 through the suction port 25, an indoor air temperature sensor 37 that detects a temperature of air inside the cabin (indoor air), an indoor air humidity sensor 38 that detects a humidity of air inside the cabin, an indoor air $CO_2$ concentration sensor 39 that detects a carbon dioxide concentration inside the cabin, a blowoff temperature sensor 41 that detects a temperature of air blown out into the cabin through the blowoff port 29, a discharge pressure sensor 42 that detects a pressure of the refrigerant discharged from the compressor 2 (a discharge pressure Pd), a discharge temperature sensor 43 that detects a temperature of the refrigerant discharged from the compressor 2, a suction temperature sensor 44 that detects a temperature of the refrigerant sucked into the compressor 2, a radiator temperature sensor 46 that detects a temperature of the radiator 4 (the temperature of air that has passed through the radiator 4 or the temperature of the radiator 4 itself: a radiator temperature TCI), a radiator pressure sensor 47 that detects a refrigerant pressure of the radiator 4 (the pressure of the refrigerant inside the radiator 4 or immediately after the refrigerant flows out of the radiator 4: a radiator pressure PCI), a heat absorber temperature sensor 48 that detects a temperature of the heat absorber 9 (the temperature of air that has passed through the heat absorber 9 or the temperature of the heat absorber 9 itself: a heat absorber temperature Te), a heat absorber pressure sensor 49 that detects a refrigerant pressure of the heat absorber 9 (the pressure of the refrigerant inside the heat absorber 9 or immediately after the refrigerant flows out of the heat absorber 9), a solar radiation sensor 51 of, for example, a photosensor system for detecting an amount of solar radiation into the cabin, a vehicle speed sensor 52 for detecting a moving speed of the vehicle (a vehicle speed), an air conditioning operation unit 53 for setting the switching of a set temperature or the air conditioning operations, an outdoor heat exchanger temperature sensor 54 that detects a temperature of the outdoor heat exchanger 7 (the temperature of the refrigerant immediately after the refrigerant flows out of the outdoor heat exchanger 7 or the temperature of the outdoor heat exchanger 7 itself: an outdoor heat exchanger temperature TXO. When the outdoor heat exchanger 7 functions as an evaporator, the outdoor heat exchanger temperature TXO corresponds to an evaporation temperature of the refrigerant in the outdoor heat exchanger 7), and an outdoor heat exchanger pressure sensor 56 that detects a refrigerant pressure of the outdoor heat exchanger 7 (the pressure of the refrigerant inside the outdoor heat exchanger 7 or immediately after the refrigerant flows out of the outdoor heat exchanger 7) are connected to an input of the air conditioning controller 32 (control device).

Further, respective outputs of a battery temperature sensor 76 that detects the temperature of the battery 55 (the temperature of the battery 55 itself, the temperature of the heating medium that has flowed out of the battery 55, or the temperature of the heating medium flowing into the battery 55: a battery temperature Tb), a heating medium outlet temperature sensor 77 that detects a temperature of the heating medium that has flowed out of the heating medium flow passage 64A of the refrigerant-heating medium heat exchanger 64, and a traveling motor temperature sensor 78 that detects the temperature of the traveling motor 65 (the temperature of the traveling motor 65 itself, the temperature of the heating medium that has flowed out of the traveling motor 65, or the temperature of the heating medium flowing into the traveling motor 65: a traveling motor temperature Tm) are also connected to the input of the air conditioning controller 32.

Note that the temperature of the heating medium that has flowed out of the battery 55 or the temperature of the heating medium flowing into the battery 55 described above serves as a value of an index indicating the temperature of the battery 55, and the temperature of the heating medium that has flowed out of the traveling motor 65 or the temperature of the heating medium flowing into the traveling motor 65 serves as a value of an index indicating the temperature of the traveling motor 65.

On the other hand, the compressor 2, the outdoor blower 15, the indoor blower (the blower fan) 27, the suction switching damper 26, the air mix damper 28, the blowoff port switching damper 31, the outdoor expansion valve 6, the indoor expansion valve 8, the solenoid valves including the solenoid valve 22 (dehumidification) and the solenoid valve 21 (heating), the auxiliary heater 23, the first and second circulating pumps 62 and 63, the auxiliary expansion valve 73, and the first to third three-way valves 81 to 83 are connected to an output of the air conditioning controller 32. Further, the air conditioning controller 32 controls these components based on the outputs of the respective sensors, setting input through the air conditioning operation unit 53, and information from the vehicle controller 35.

Next, an operation of the vehicle air conditioning apparatus 1 of the embodiment having the above configuration will be described. In the embodiment, the air conditioning controller 32 (control device) executes the air conditioning operations including the heating operation, the dehumidifying and heating operation, the dehumidifying and cooling operation, and the cooling operation in a switching manner and adjusts the temperature of the battery 55 and the temperature of the traveling motor 65 (the temperature-adjusted object). First, each air conditioning operation of the refrigerant circuit R of the vehicle air conditioning apparatus 1 will be described.

(1) Heating Operation (Air Conditioning Operation for Heating Inside of Cabin)

Figure 3:
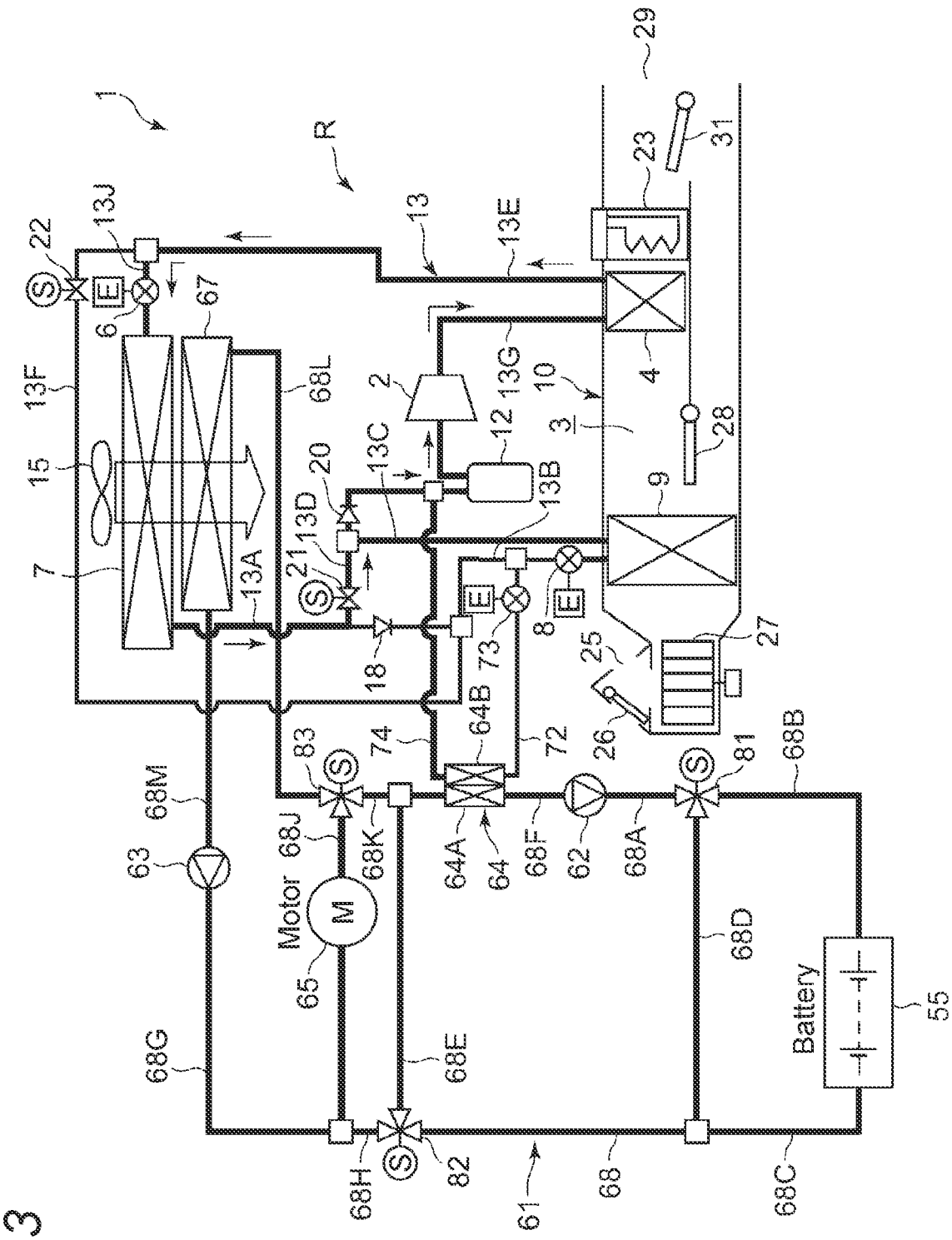
FIG. 3 is a diagram describing a heating operation executed by the air conditioning controller of FIG. 2.

First, the heating operation will be described with reference to FIG. 3. FIG. 3 illustrates the flow (solid-line arrows) of the refrigerant of the refrigerant circuit R in the heating operation. When the heating operation is selected by the air conditioning controller 32 (an automatic mode) or through a manual operation to the air conditioning operation unit 53 (a manual mode), for example, in winter, the air conditioning controller 32 opens the solenoid valve 21 (for heating) and fully closes the indoor expansion valve 8. Further, the solenoid valve 22 (for dehumidification) is closed.

Then, the compressor 2 and the blowers 15 and 27 are operated, and the air mix damper 28 is brought into a state of adjusting a proportion by which air blown out of the indoor blower 27 is to be passed to the radiator 4 and the auxiliary heater 23. Consequently, the high-temperature and high-pressure gas refrigerant discharged from the compressor 2 flows into the radiator 4. Since air inside the air flow passage 3 is passed through the radiator 4, the air inside the air flow passage 3 is heated by the high-temperature refrigerant inside the radiator 4. On the other hand, the refrigerant inside the radiator 4 is cooled by the air taking heat from the refrigerant, and thus condenses and liquefies.

The refrigerant liquefied inside the radiator 4 flows out of the radiator 4 and then reaches the outdoor expansion valve 6 through the refrigerant pipes 13E and 13J. The refrigerant flowing into the outdoor expansion valve 6 is decompressed therein and then flows into the outdoor heat exchanger 7. The refrigerant flowing into the outdoor heat exchanger 7 evaporates and absorbs heat from outdoor air passed through running or by the outdoor blower 15 (heat absorption). That is, the refrigerant circuit R serves as a heat pump. Then, the low-temperature refrigerant flowing out of the outdoor heat exchanger 7 reaches the refrigerant pipe 13C through the refrigerant pipe 13A, the refrigerant pipe 13D, and the solenoid valve 21, enters the accumulator 12 through the check valve 20 on the refrigerant pipe 13C, and is gas-liquid separated therein, and the gas refrigerant is sucked into the compressor 2, thereby repeating circulation. The air heated in the radiator 4 is blown out through the blowoff port 29, thereby performing heating inside the cabin.

The air conditioning controller 32 calculates a target radiator pressure PCO (a target value of the pressure PCI of the radiator 4) from a target heater temperature TCO (a target value of the air temperature on the leeward side of the radiator 4) calculated from a target blowoff temperature TAO (described later), and controls a rotation speed of the compressor 2 based on the target radiator pressure PCO and the refrigerant pressure of the radiator 4 (the radiator pressure PCI, a high pressure of the refrigerant circuit R) detected by the radiator pressure sensor 47 and controls an opening degree of the outdoor expansion valve 6 based on the temperature of the radiator 4 (the radiator temperature TCI) detected by the radiator temperature sensor 46 and the radiator pressure PCI detected by the radiator pressure sensor 47 to control a subcooling degree of the refrigerant at the outlet of the radiator 4. Although the above-mentioned target heater temperature TCO basically satisfies TCO=TAO, a predetermined limit on control is set. Further, when a heating capacity of the heat radiator 4 is insufficient, the auxiliary heater 23 is energized so as to generate heat to complement the heating capacity.

(2) Dehumidifying and Heating Operation (Air Conditioning Operation for Heating Inside of Cabin)

Figure 4:
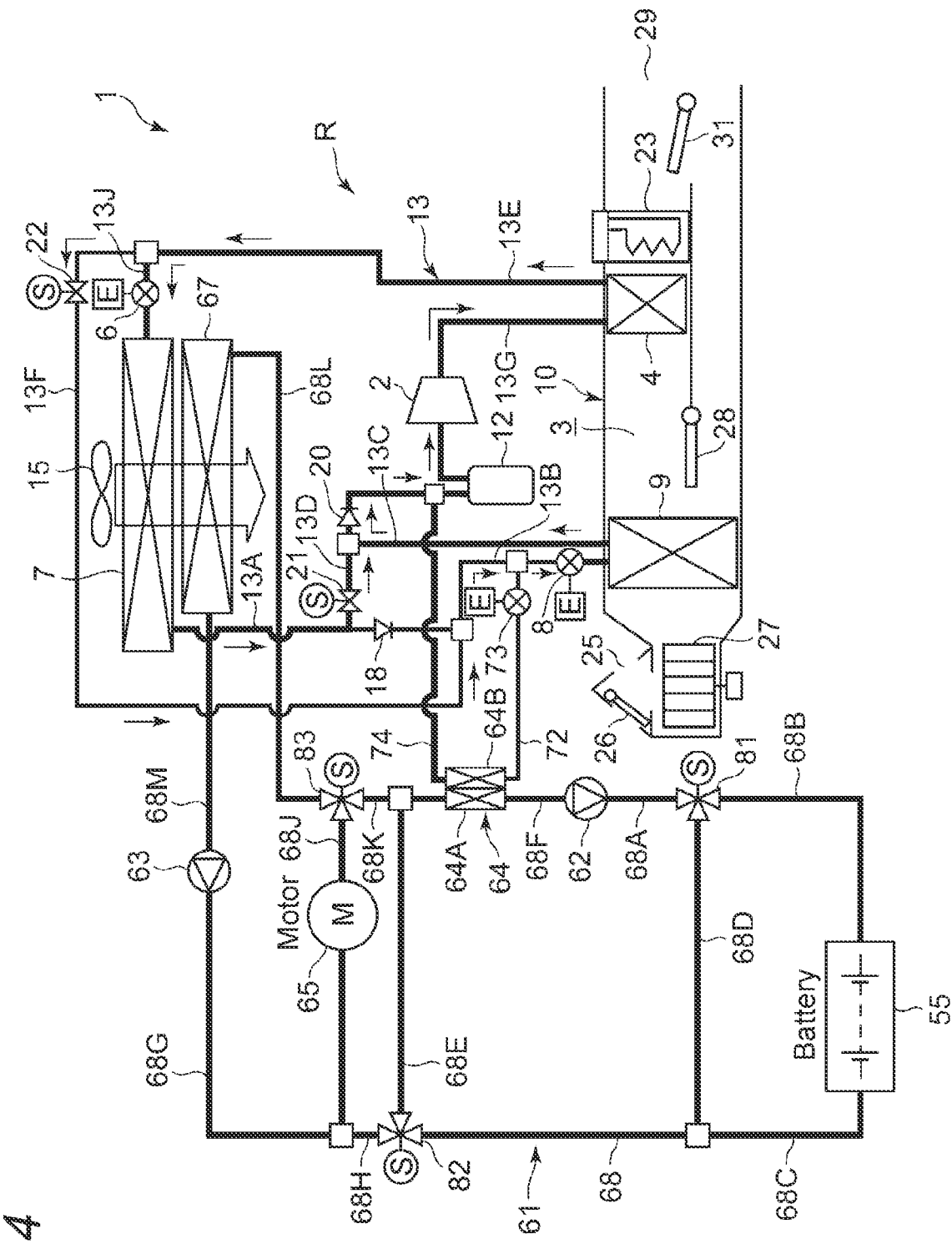
FIG. 4 is a diagram describing a dehumidifying and heating operation executed by the air conditioning controller of FIG. 2.

Next, the dehumidifying and heating operation will be described with reference to FIG. 4. FIG. 4 illustrates the flow (solid-line arrows) of the refrigerant of the refrigerant circuit R in the dehumidifying and heating operation. In the dehumidifying and heating operation, the air conditioning controller 32 opens the solenoid valve 22 in the state of the heating operation described above and opens the indoor expansion valve 8 to decompress and expand the refrigerant. Consequently, a part of the condensed refrigerant flowing into the refrigerant pipe 13E through the radiator 4 is diverted, the diverted refrigerant flows into the refrigerant pipe 13F through the solenoid valve 22 and flows to the indoor expansion valve 8 through the refrigerant pipe 13B, and the residual refrigerant flows to the outdoor expansion valve 6. That is, the diverted part of the refrigerant is decompressed in the indoor expansion valve 8, and then flows into the heat absorber 9 and evaporates.

The air conditioning controller 32 controls an opening degree of the indoor expansion valve 8 so as to maintain a superheat degree (SH) of the refrigerant at the outlet of the heat absorber 9 at a predetermined value. Water in air blown out of the indoor blower 27 coagulates and adheres to the heat absorber 9 due to a heat absorbing action of the refrigerant occurring in the heat absorber 9 at this time, and the air is thus cooled and dehumidified. The residual refrigerant flowing into the refrigerant pipe 13J is decompressed in the outdoor expansion valve 6 and then evaporates in the outdoor heat exchanger 7.

The refrigerant evaporated in the heat absorber 9 flows out to the refrigerant pipe 13C and merges with the refrigerant from the refrigerant pipe 13D (the refrigerant from the outdoor heat exchanger 7), and is then sucked into the compressor 2 through the check valve 20 and the accumulator 12, thereby repeating circulation. The air dehumidified in the heat absorber 9 is reheated in the process of passing through the radiator 4, thereby performing dehumidification and heating inside the cabin.

The air conditioning controller 32 controls the rotation speed of the compressor 2 based on the target radiator pressure PCO calculated from the target heater temperature TCO and the radiator pressure PCI (the high pressure of the refrigerant circuit R) detected by the radiator pressure sensor 47 and controls the opening degree of the outdoor expansion valve 6 based on the temperature of the heat absorber 9 (the heat absorber temperature Te) detected by the heat absorber temperature sensor 48.

(3) Dehumidifying and Cooling Operation (Air Conditioning Operation for Cooling Inside of Cabin)

Figure 5:
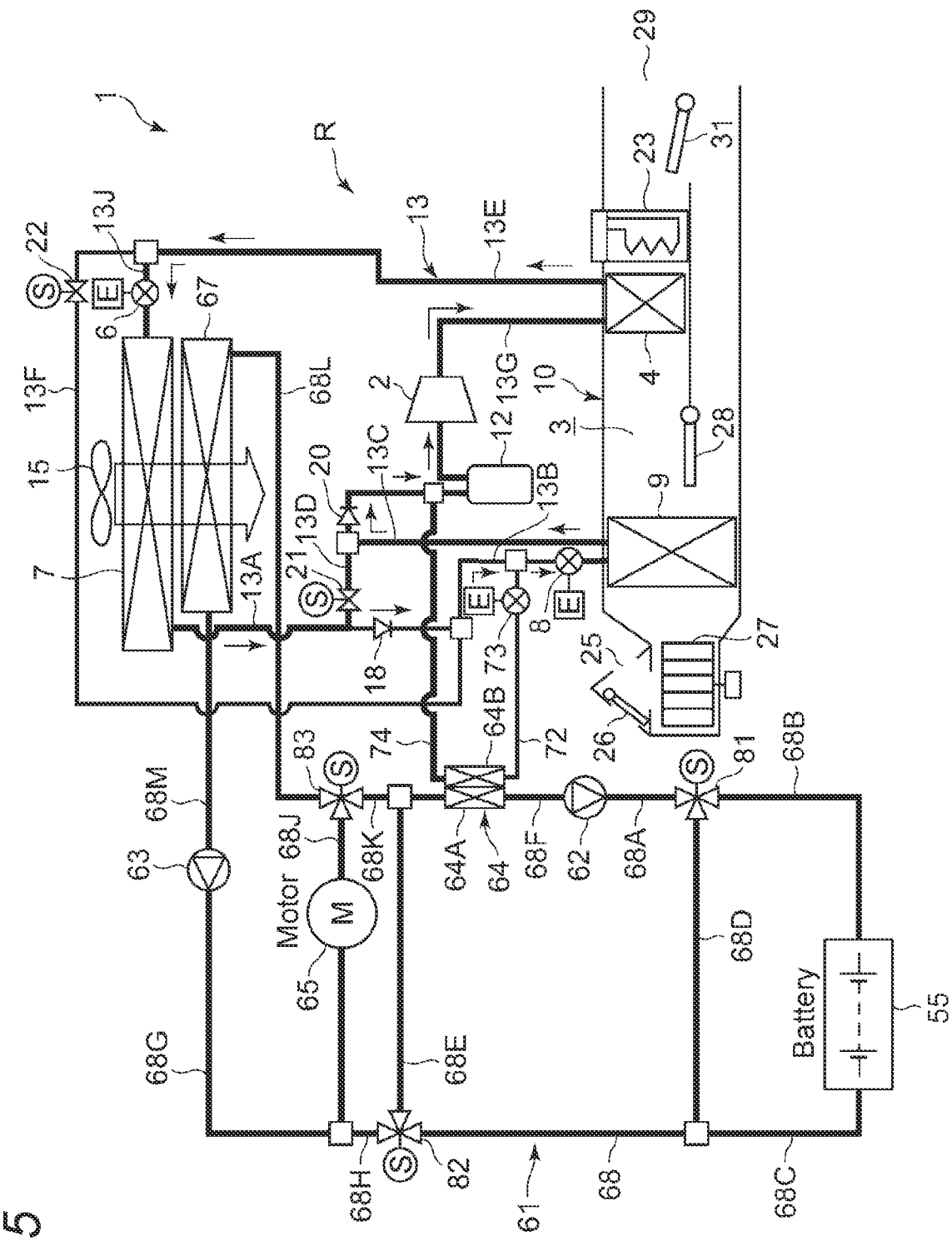
FIG. 5 is a diagram describing a dehumidifying and cooling operation/cooling operation executed by the air conditioning controller of FIG. 2.

Next, the dehumidifying and cooling operation will be described with reference to FIG. 5. FIG. 5 illustrates the flow (solid-line arrows) of the refrigerant of the refrigerant circuit R in the dehumidifying and cooling operation. In the dehumidifying and cooling operation, the air conditioning controller 32 opens the indoor expansion valve 8 to decompress and expand the refrigerant, and closes the solenoid valve 21 and the solenoid valve 22. Further, the compressor 2 and the blowers 15 and 27 are operated, and the air mix damper 28 is brought into a state of adjusting the proportion by which air blown out of the indoor blower 27 is to be passed to the radiator 4 and the auxiliary heater 23. Consequently, the high-temperature and high-pressure gas refrigerant discharged from the compressor 2 flows into the radiator 4. Since air inside the air flow passage 3 passes through the radiator 4, the air inside the air flow passage 3 is heated by the high-temperature refrigerant inside the radiator 4. On the other hand, the refrigerant inside the radiator 4 is cooled by the air taking heat from the refrigerant, and thus condenses and liquefies.

The refrigerant flowing out of the radiator 4 reaches the outdoor expansion valve 6 through the refrigerant pipe 13E and flows into the outdoor heat exchanger 7 through the outdoor expansion valve 6 controlled to be slightly open. The refrigerant flowing into the outdoor heat exchanger 7 is cooled therein by outdoor air passed through running or by the outdoor blower 15 and thus condenses. The refrigerant flowing out of the outdoor heat exchanger 7 flows into the refrigerant pipe 13B through the refrigerant pipe 13A and the check valve 18 and reaches the indoor expansion valve 8. The refrigerant is decompressed in the indoor expansion valve 8, and then flows into the heat absorber 9 and evaporates. Water in air blown out of the indoor blower 27 coagulates and adheres to the heat absorber 9 due to the heat absorbing action at this time, and the air is thus cooled and dehumidified.

The refrigerant evaporated in the heat absorber 9 reaches the accumulator 12 through the refrigerant pipe 13C and the check valve 20, and is then sucked into the compressor 2 through the accumulator 12, thereby repeating circulation. The air cooled and dehumidified in the heat absorber 9 is reheated in the process of passing through the radiator 4 (reheating: a heat dissipation capacity is lower than that in heating), thereby performing the dehumidification and cooling inside the cabin.

The air conditioning controller 32 controls, based on the temperature of the heat absorber 9 (the heat absorber temperature Te) detected by the heat absorber temperature sensor 48 and a target heat absorber temperature TEO as a target value thereof, the rotation speed of the compressor 2 so that the heat absorber temperature Te becomes the target heat absorber temperature TEO, and controls, based on the radiator pressure PCI (the high pressure of the refrigerant circuit R) detected by the radiator pressure sensor 47 and the target radiator pressure PCO (the target value of the radiator pressure PCI) calculated from the target heater temperature TCO, the opening degree of the outdoor expansion valve 6 so that the radiator pressure PCI becomes the target radiator pressure PCO, thereby obtaining a required amount of reheat by the radiator 4.

(4) Cooling Operation (Air Conditioning Operation for Cooling Inside of Cabin)

Next, the cooling operation will be described. The flow in the refrigerant circuit R is similar to that in the dehumidifying and cooling operation of FIG. 5. In the cooling operation executed, for example, in summer, the air conditioning controller 32 sets the opening degree of the outdoor expansion valve 6 to full open in the state of the dehumidifying and cooling operation described above. Note that the air mix damper 28 is brought into a state of adjusting the proportion by which air is to be passed to the radiator 4 and the auxiliary heater 23.

Consequently, the high-temperature and high-pressure gas refrigerant discharged from the compressor 2 flows into the radiator 4. Although air inside the air flow passage 3 is passed to the radiator 4, the proportion thereof is small (only for reheat in cooling). Thus, the refrigerant substantially merely passes through the radiator 4, and the refrigerant flowing out of the radiator 4 reaches the outdoor expansion valve 6 through the refrigerant pipe 13E. Since the outdoor expansion valve 6 is fully open at this time, the refrigerant passes, as it is, through the outdoor expansion valve 6 and the refrigerant pipe 13J, and flows into the outdoor heat exchanger 7. The refrigerant is cooled in the outdoor heat exchanger 7 by outdoor air passed through running or by the outdoor blower 15, and thus condenses and liquefies.

The refrigerant flowing out of the outdoor heat exchanger 7 flows into the refrigerant pipe 13B through the refrigerant pipe 13A and the check valve 18, and reaches the indoor expansion valve 8. The refrigerant is decompressed in the indoor expansion valve 8, and then flows into the heat absorber 9 and evaporates. Water in air blown out of the indoor blower 27 coagulates and adheres to the heat absorber 9 due to the heat absorbing action at this time, and the air is thus cooled.

The refrigerant evaporated in the heat absorber 9 reaches the accumulator 12 through the refrigerant pipe 13C and the check valve 20, and is sucked into the compressor 2 through the accumulator 12, thereby repeating circulation. Air cooled and dehumidified in the heat absorber 9 is blown out into the cabin through the blowoff port 29, thereby performing cooling inside the cabin. In this cooling operation, the air conditioning controller 32 controls the rotation speed of the compressor 2 based on the temperature of the heat absorber 9 (the heat absorber temperature Te) detected by the heat absorber temperature sensor 48.

(5) Switching of Air Conditioning Operation

The air conditioning controller 32 calculates the target blowoff temperature TAO described above from the following Equation (I). The target blowoff temperature TAO is a target value of the temperature of air to be blown out into the cabin through the blowoff port 29.

$$TAO=(Tset-Tin) \times K+Tbal(f(Tset,SUN,Tam)) \quad (I)$$

Here, Tset is the set temperature inside the cabin set through the air conditioning operation unit 53, Tin is the temperature of air inside the cabin detected by the indoor air temperature sensor 37, K is a coefficient, and Tbal is a balance value calculated from the set temperature Tset, the solar radiation amount SUN detected by the solar radiation sensor 51, and the outdoor air temperature Tam detected by the outdoor air temperature sensor 33. Further, typically, as the outdoor air temperature Tam decreases, the target blowoff temperature TAO increases, and, as the outdoor air temperature Tam increases, the target blowoff temperature TAO decreases.

Further, the air conditioning controller 32 selects any of the above-mentioned air conditioning operations based on the outdoor air temperature Tam detected by the outdoor air temperature sensor 33 and the target blowoff temperature TAO at startup. Further, after the startup, the air conditioning controller 32 performs selection and switching between the above-mentioned air conditioning operations in accordance with changes in environments and setting conditions such as the outdoor air temperature Tam and the target blowoff temperature TAO.

(6) Heating/Waste Heat Recovery Mode

Next, a heating/waste heat recovery mode executed by the air conditioning controller 32 in the heating operation or the dehumidifying and heating operation described above will be described with reference to FIG. 6. That is, the air conditioning controller 32 has the heating/waste heat recovery mode described below. Note that, in the following description, a case where the heating/waste heat recovery mode is performed during the heating operation will be described.

As described above, the traveling motor 65 generates heat by being driven through traveling. When the temperature thereof becomes abnormally high, the traveling motor 65 falls into malfunction, and the performance is reduced. At worst, there is also a risk of breakdown. An appropriate temperature range (operating temperature range) of the traveling motor 65 is commonly known and defined as −15° C. or higher and +60° C. or lower in this application. Further, in this application, for example, −15° C., which is the lowest value in the appropriate temperature range of the traveling motor 65, is defined as a lower limit threshold TLm of the temperature of the traveling motor 65 (the traveling motor temperature Tm), and +60° C., which is the highest value, is defined as an upper limit threshold THm.

Further, the temperature of the battery 55 varies with the outdoor air temperature and also varies due to self-heating. Further, when the outdoor air temperature is in a high temperature environment or an extremely low temperature environment, the temperature of the battery 55 becomes extremely high or extremely low, which makes charge and discharge difficult. An appropriate temperature range (operating temperature range) of the battery 55 is also commonly known and narrower than the appropriate temperature range of the traveling motor 65, and defined as 0° C. or higher and +40° C. or lower in this application. Further, in this application, for example, 0° C., which is the lowest value in the appropriate temperature range of the battery 55, is defined as a lower limit threshold TLb of the temperature of the battery 55 (the battery temperature Tb), and +40° C., which is the highest value, is defined as an upper limit threshold THb.

Further, if waste heat of the traveling motor 65 or the battery 55 can be recovered when the temperature of the traveling motor 65 or the battery 55 becomes high, it is possible to allow the waste heat to contribute to heating inside the cabin while cooling the traveling motor 65 or the battery 55 in the heating operation or the humidifying and heating operation. However, since, in particular, the heating operation is performed under a low outdoor air temperature environment, for example, in winter, the temperature of the battery 55 is less likely to increase, and the necessity of cooling the battery 55 is thus low. Instead, cooling the battery 55 may cause the risk of making the battery temperature Tb too low and reducing the performance, and a waste heat recovery effect cannot be expected much.

On the other hand, the traveling motor 65 becomes high temperature by being driven also under the low outdoor air temperature environment, for example, in winter, and thus needs to be cooled for stable operation. Also, as described above, the traveling motor 65 has a wider appropriate temperature range at both the high-temperature side and the low-temperature side than the battery 55 and can be driven at a lower temperature. Thus, for example, when the traveling motor temperature Tm detected by the traveling motor temperature sensor 78 increases to the above-mentioned upper limit threshold THm or higher in the heating operation, the air conditioning controller 32 executes the heating/waste heat recovery mode described below.

Figure 6:
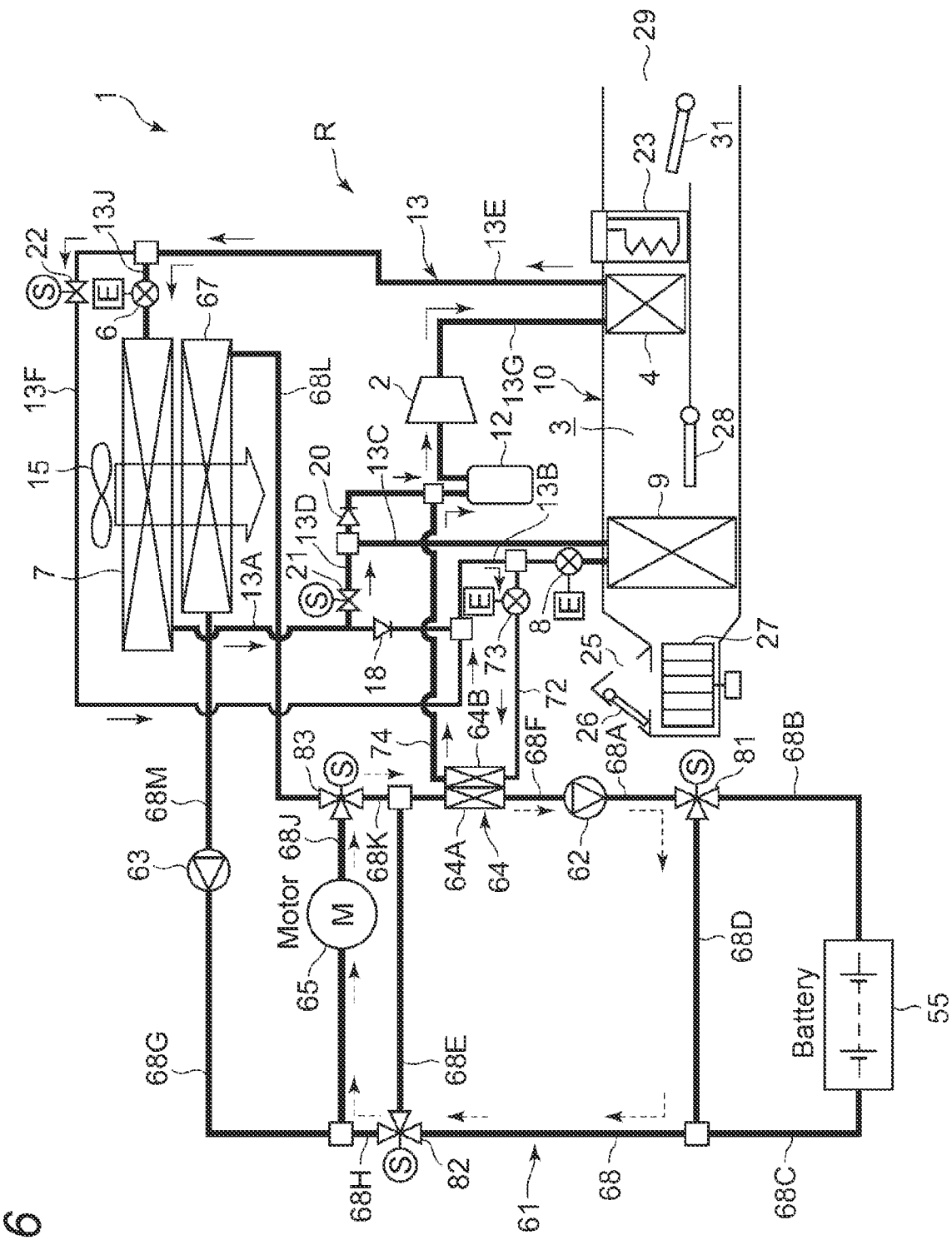
FIG. 6 is a diagram describing a heating/waste heat recovery mode executed by the air conditioning controller of FIG. 2.

FIG. 6 illustrates the flow (solid-line arrows) of the refrigerant of the refrigerant circuit R and the flow (broken-line arrows) of the heating medium of the equipment temperature adjusting device 61 in the heating/waste heat recovery mode. In the heating/waste heat recovery mode, the air conditioning controller 32 further opens the solenoid valve 22 and also opens the auxiliary expansion valve 73 to control the opening degree thereof in the state of the heating operation of the refrigerant circuit R illustrated in FIG. 3. Then, the air conditioning controller 32 controls the first to third three-way valves 81 to 83 of the equipment temperature adjusting device 61 to bring the flow of the heating medium inside the heating medium pipe 68 into the first flow passage control state described above and operates the first circulating pump 62.

Consequently, a part of the refrigerant flowing out of the radiator 4 is diverted on the refrigerant upstream side of the outdoor expansion valve 6 and reaches the refrigerant upstream side of the indoor expansion valve 8 through the refrigerant pipe 13F. The refrigerant then enters the branch pipe 72 and is decompressed in the auxiliary expansion valve 73, and then flows into the refrigerant flow passage 64B of the refrigerant-heating medium heat exchanger 64 through the branch pipe 72 and evaporates. At this time, the heat absorbing action is exhibited. The refrigerant evaporated in the refrigerant flow passage 64B sequentially flows through the refrigerant pipe 74, the refrigerant pipe 13C, and the accumulator 12, and is sucked into the compressor 2, thereby repeating circulation (indicated by the solid-line arrows in FIG. 6).

On the other hand, the heating medium discharged from the first circulating pump 62 flows through the heating medium pipe 68A, the first three-way valve 81, the heating medium pipe 68D, the heating medium pipe 68C, the second three-way valve 82, the heating medium pipe 68H, the heating medium pipe 68G, the traveling motor 65, the heating medium pipe 68J, the third three-way valve 83, the heating medium pipe 68K, the heating medium pipe 68E, the heating medium flow passage 64A of the refrigerant-heating medium heat exchanger 64, and the heating medium pipe 68F in this order, and is sucked into the first circulating pump 62, thereby performing circulation (indicated by the broken-line arrows in FIG. 6: the first flow passage control state).

Thus, the heating medium cooled by the refrigerant absorbing heat from the heating medium in the heating medium flow passage 64A of the refrigerant-heating medium heat exchanger 64 is circulated to the traveling motor 65, and exchanges heat with the traveling motor 65 to recover waste heat from the traveling motor 65 and cool the traveling motor 65. However, since the heating medium is not circulated to the battery 55, the battery 55 is not cooled by the heating medium (refrigerant). The waste heat recovered from the traveling motor 65 is absorbed by the refrigerant in the refrigerant-heating medium heat exchanger 64 and contributes to heating inside the cabin in the radiator 4.

Note that, for example, when the traveling motor temperature Tm detected by the traveling motor temperature sensor 78 decreases to the above-mentioned lower limit threshold TLm or lower, the air conditioning controller 32 finishes the heating/waste heat recovery mode. In this manner, the temperature of the traveling motor 65 is maintained within the above-mentioned appropriate temperature range.

Further, the air conditioning controller 32 executes a heating/waste heat recovery mode similar to that in the heating operation described above also in the dehumidifying and heating operation. In this case, the auxiliary expansion valve 73 is opened in the state of FIG. 4 to divert a part of the refrigerant flowing into the refrigerant pipe 13B to the branch pipe 72. Then, the diverted refrigerant absorbs heat from the heating medium in the refrigerant-heating medium heat exchanger 64 and is then sucked into the compressor 2 as with the case of FIG. 6.

(7) Cooling/Battery Cooling and Temperature-Adjusted Object Cooling Mode

Next, a cooling/battery cooling and temperature-adjusted object cooling mode executed by the air conditioning controller 32 in the cooling operation or the dehumidifying and cooling operation described above will be described with reference to FIG. 7. That is, the air conditioning controller 32 has the cooling/battery cooling and temperature-adjusted object cooling mode described below.

As described above, the temperature of the battery 55 increases, for example, in summer when the outdoor air temperature is high and also increases due to self-heating. Further, the traveling motor 65 also generates heat by being driven through traveling to increase its temperature. Thus, the battery 55 and the traveling motor 65 are reduced in performance, and there is also a risk of breakdown at worst. Therefore, cooling is required for stable operation. However, as described above, the traveling motor 65 can be driven at a higher temperature than the battery 55 (has a wider appropriate temperature range). Thus, when the battery temperature Tb detected by the battery temperature sensor 76 increases to the above-mentioned upper limit threshold THb or higher in the cooling operation or the dehumidifying and cooling operation, the air conditioning controller 32 executes the cooling/battery cooling and temperature-adjusted object cooling mode described below.

Figure 7:
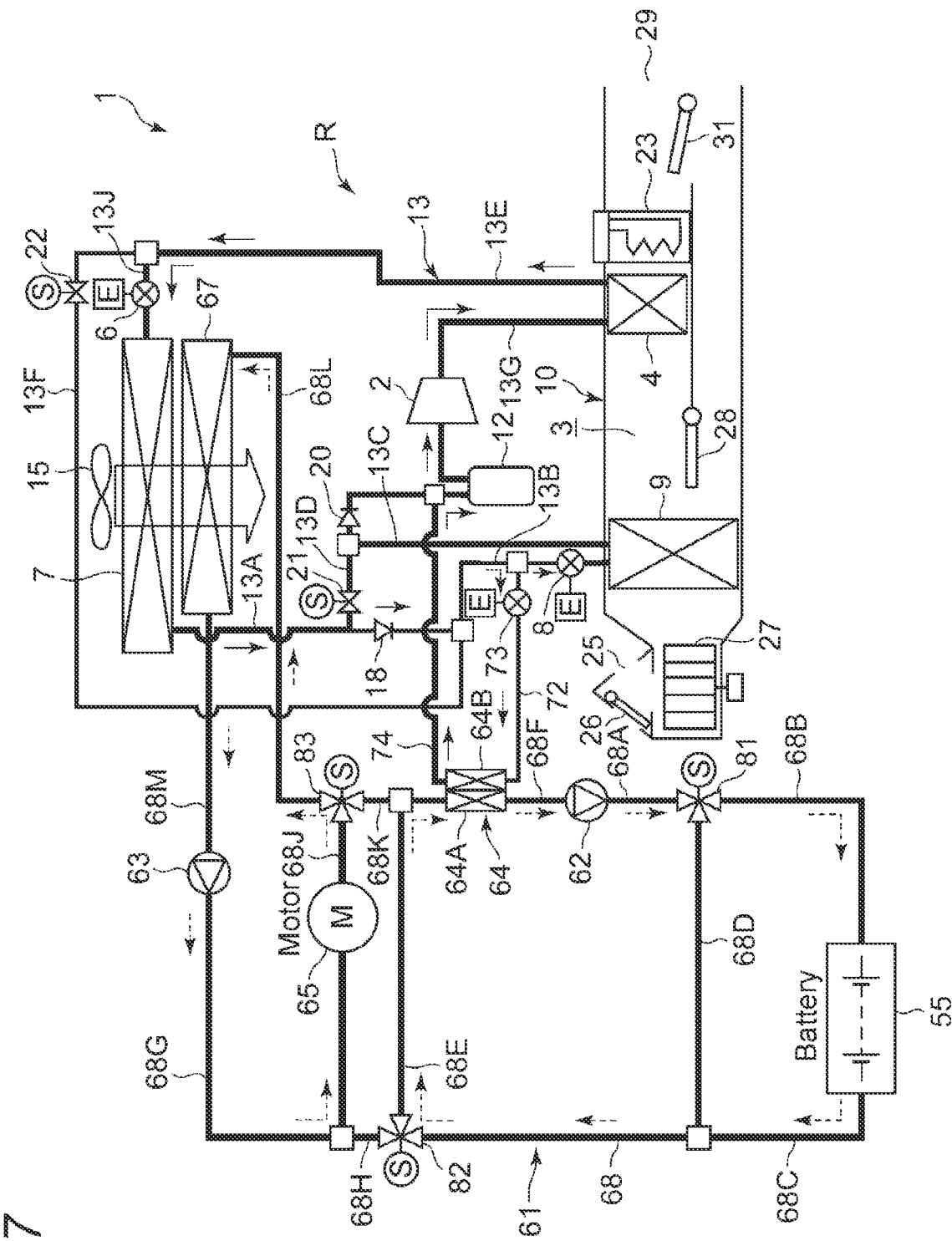
FIG. 7 is a diagram describing a cooling/battery cooling and temperature-adjusted object cooling mode executed by the air conditioning controller of FIG. 2.

FIG. 7 illustrates the flow (solid-line arrows) of the refrigerant of the refrigerant circuit R and the flow (broken-line arrows) of the heating medium of the equipment temperature adjusting device 61 in the cooling/battery cooling and temperature-adjusted object cooling mode. In the cooling/battery cooling and temperature-adjusted object cooling mode, the air conditioning controller 32 opens the auxiliary expansion valve 73 to control the opening degree thereof in the state of the cooling operation or the dehumidifying and cooling operation of the refrigerant circuit R illustrated in FIG. 5. Then, the air conditioning controller 32 controls the first to third three-way valves 81 to 83 of the equipment temperature adjusting device 61 to bring the flow of the heating medium inside the heating medium pipe 68 into the second flow passage control state described above and operates the first and second circulating pumps 62 and 63.

Consequently, the high-temperature refrigerant discharged from the compressor 2 flows into the outdoor heat exchanger 7 through the radiator 4, and dissipates heat therein by exchanging heat with outdoor air passed by the outdoor blower 15 or traveling wind and thus condenses. A part of the refrigerant condensed in the outdoor heat exchanger 7 reaches the indoor expansion valve 8 and is decompressed therein, and then flows into the heat absorber 9 and evaporates. Since air inside the air flow passage 3 is cooled due to the heat absorbing action at this time, the inside of the cabin is cooled.

The residual refrigerant condensed in the outdoor heat exchanger 7 is diverted to the branch pipe 72, decompressed by the auxiliary expansion valve 73, and then evaporates in the refrigerant flow passage 64B of the refrigerant-heating medium heat exchanger 64. In the refrigerant flow passage 64B, the refrigerant absorbs heat from the heating medium circulating inside the equipment temperature adjusting device 61. The refrigerant flowing out of the heat absorber 9 is sucked into the compressor 2 through the refrigerant pipe 13C, the check valve 20, and the accumulator 12. The refrigerant flowing out of the refrigerant-heating medium heat exchanger 64 is also sucked into the compressor 2 through the refrigerant pipe 74 and the accumulator 12 (indicated by the solid-line arrows in FIG. 7).

On the other hand, the heating medium discharged from the first circulating pump 62 flows through the heating medium pipe 68A, the first three-way valve 81, the heating medium pipe 68B, the battery 55, the heating medium pipe 68C, the second three-way valve 82, the heating medium pipe 68E, the heating medium flow passage 64A of the refrigerant-heating medium heat exchanger 64, and the heating medium pipe 68F in this order, and is sucked into the first circulating pump 62. Further, the heating medium discharged from the second circulating pump 63 flows through the heating medium pipe 68G, the traveling motor 65, the heating medium pipe 68J, the third three-way valve 83, the heating medium pipe 68L, the air-heating medium heat exchanger 67, and the heating medium pipe 68M in this order, and is sucked into the second circulating pump 63, thereby performing circulation (indicated by the broken-line arrows of FIG. 7: the second flow passage control state).

Thus, the heating medium cooled by the refrigerant absorbing heat from the heating medium in the heating medium flow passage 64A of the refrigerant-heating medium heat exchanger 64 is circulated to the battery 55 and exchanges heat with the battery 55 to strongly cool the battery 55. On the other hand, the heating medium cooled by outdoor air (air-cooled) in the air-heating medium heat exchanger 67 is circulated to the traveling motor 65 and exchanges heat with the traveling motor 65 to cool the traveling motor 65.

Note that, for example, when the battery temperature Tb detected by the battery temperature sensor 76 decreases to the above-mentioned lower limit threshold TLb or lower, the air conditioning controller 32 finishes the cooling/battery cooling and temperature-adjusted object cooling mode. In this manner, the temperature of the battery 55 is maintained within the above-mentioned appropriate temperature range, and the temperature of the traveling motor 65 is also maintained within the appropriate temperature range though in a dependent relationship.

As described above, the air conditioning controller 32 has the heating/waste heat recovery mode for cooling the traveling motor 65 without cooling the battery 55 with the refrigerant by controlling the equipment temperature adjusting device 61 in the air conditioning operation for heating the inside of the cabin. Thus, in the heating operation or the dehumidifying and heating operation, it becomes possible to heat the inside of the cabin while recovering heat of the traveling motor 65, which is the temperature-adjusted object other than the battery 55, the temperature-adjusted object being mounted on the vehicle, into the refrigerant and cooling the traveling motor 65 without cooling the battery 55.

As a result, when heating inside the cabin is performed, it is possible to efficiently perform the heating inside the cabin by effectively using heat of the traveling motor 65, which is the temperature-adjusted object other than the battery 55, and cool the traveling motor 65 while reducing frost formation on the outdoor heat exchanger 7. At this time, the battery 55 is not cooled. Thus, it is also possible to avoid, in advance, an adverse effect on the battery 55 under an environment where cooling of the battery 55 is not required, for example, in winter when the outdoor air temperature is particularly low.

In this case, in the embodiment, when the when the traveling motor temperature Tm detected by the traveling motor temperature sensor 78 increases to the upper limit threshold THm or higher, the air conditioning controller 32 executes the heating/waste heat recovery mode. Thus, it is possible to appropriately start the heating/waste heat recovery mode for cooling only the traveling motor 65.

Further, in the embodiment, the equipment temperature adjusting device 61 is provided with the first and second circulating pumps 62 and 63 for circulating the heating medium to the battery 55 and the traveling motor 65, the refrigerant-heating medium heat exchanger 64 for exchanging heat between the refrigerant and the heating medium, and the first to third three-way valves 81 to 83 for controlling the circulation of the heating medium to the battery 55 and the traveling motor 65. In the heating/waste heat recovery mode, the air conditioning controller 32 decompresses the refrigerant and then passes the refrigerant to the refrigerant-heating medium heat exchanger 64 to cause the refrigerant to absorb heat from the heating medium, and circulates the heating medium flowing out of the refrigerant-heating medium heat exchanger 64 to the traveling motor 65 without circulating the heating medium to the battery 55. Thus, it is possible to smoothly achieve an operation of cooling the traveling motor 65 and recovering waste heat thereof into the refrigerant without cooling the battery 55.

Further, in the embodiment, the air conditioning controller 32 has the cooling/battery cooling and temperature-adjusted object cooling mode for cooling the battery 55 and the traveling motor 65 by controlling the equipment temperature adjusting device 61 in the cooling operation or the dehumidifying or cooling operation. Thus, under the environment where the outdoor air temperature is high, for example, in summer, it is possible to cool both the battery 55 and the traveling motor 65 to avoid reduction in performance.

Also in this case, in the present embodiment, when the battery temperature Tb detected by the battery temperature sensor 76 increases to the upper limit threshold THb or higher, the air conditioning controller 32 executes the cooling/battery cooling and temperature-adjusted object cooling mode. Thus, it is possible to appropriately avoid the inconvenience of reduction in performance caused by increase in the temperature of the battery 55.

In particular, in the embodiment, the equipment temperature adjusting device 61 is provided with the air-heating medium heat exchanger 67 for exchanging heat between outdoor air and the heating medium. In the cooling/battery cooling and temperature-adjusted object cooling mode, the air conditioning controller 32 decompresses the refrigerant and then passes the refrigerant to the refrigerant-heating medium heat exchanger 64 to cause the refrigerant absorb heat from the heating medium, and operates the first and second circulating pumps 62 and 63 to circulate the heating medium flowing out of the refrigerant-heating medium heat exchanger to the battery 55 to cool the battery 55 and circulate the heating medium between the traveling motor 65 and the air-heating medium heat exchanger 67 to cool the traveling motor 65. Thus, it is possible to more smoothly cool the traveling motor 65, which is the temperature-adjusted object other than the battery, using outdoor air while cooling the battery 55 using the refrigerant.

In this case, in the embodiment, the air-heating medium heat exchanger 67 is disposed on the leeward side of the outdoor heat exchanger 7. Thus, it is also possible to avoid the inconvenience of the air-heating medium heat exchanger 67 interfering with the heat dissipation action of the outdoor heat exchanger 7 in the cooling/battery cooling and temperature-adjusted object cooling mode.

Second Embodiment

Next, a configuration and operation of a vehicle air conditioning apparatus 1 of another embodiment of the present invention will be described with reference to FIG. 8. The configuration of this embodiment differs from that in the case of the first embodiment (FIG. 1) only in an equipment temperature adjusting device 61, and the other part is similar to that of the first embodiment. In the equipment temperature adjusting device 61 of this embodiment, a heating medium pipe 68N is connected to the outlet of the battery 55 and also connected to an inlet of a fourth three-way valve 84 that is also the flow passage switching device. Further, the heating medium pipe 68C described above is connected to one outlet of the fourth three-way valve 84.

Further, a heating medium pipe 68R is connected to the other outlet of the fourth three-way valve 84 and also connected to a suction side of a third circulating pump 87 that is also the circulating device. A heating medium pipe 68S is connected to a discharge side of the third circulating pump 87 and also connected to an inlet of a heating medium heating heater 66 as the heating device. Further, an outlet of the heating medium heating heater 66 is connected to a heating medium pipe 68T, and the heating medium pipe 68T is connected, in communication, to the heating medium pipe 68B between the first three-way valve 81 and the battery 55.

Note that the heating medium heating heater 66 includes an electric heater such as a PTC heater, and the heating medium heating heater 66 and the fourth three-way valve 84 are also controlled by the air conditioning controller 32 (indicated by broken lines in FIG. 2).

Figure 8:
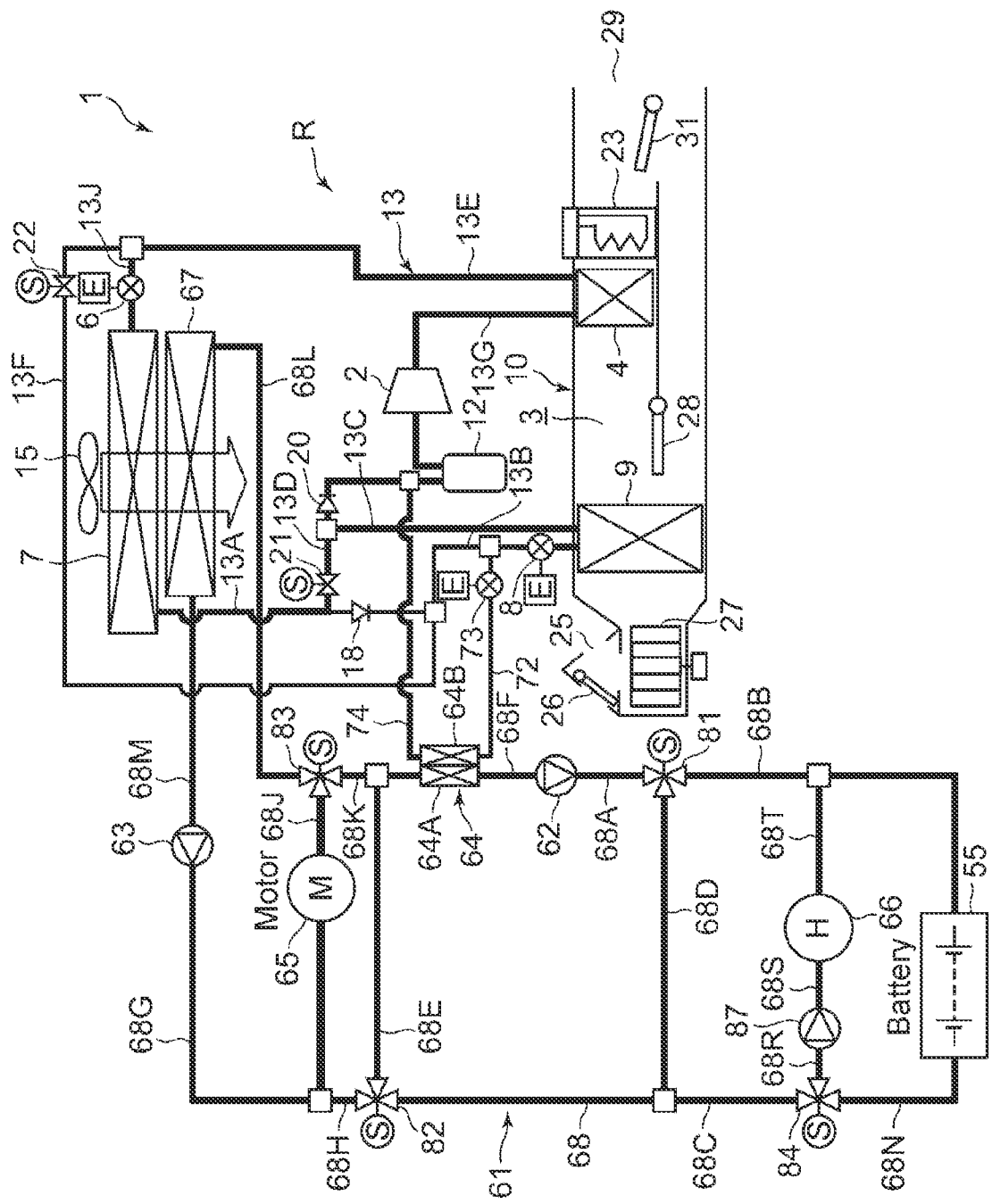
FIG. 8 is a configuration diagram of a vehicle air conditioning apparatus of another embodiment to which the present invention is applied (second embodiment).

Further, also in the vehicle air conditioning apparatus 1 of FIG. 8, when the first circulating pump 62 is operated with the first three-way valve 81 switched to a state where the inlet and the other outlet communicate with each other, the second three-way valve 82 switched to a state where the inlet and the other outlet communicate with each other, and the third three-way valve 83 switched to a state where the inlet and the one outlet communicate with each other, the heating medium discharged from the first circulating pump 62 flows through the heating medium pipe 68A, the first three-way valve 81, the heating medium pipe 68D, the heating medium pipe 68C, the second three-way valve 82, the heating medium pipe 68H, the heating medium pipe 68G, the traveling motor 65, the heating medium pipe 68J, the third three-way valve 83, the heating medium pipe 68K, the heating medium pipe 68E, the heating medium flow passage 64A of the refrigerant-heating medium heat exchanger 64, and the heating medium pipe 68F in this order, and is sucked into the first circulating pump 62.

Thus, since the first flow passage control state of the first embodiment is executable also in the equipment temperature adjusting device 61 of this embodiment, when the traveling motor temperature Tm increases to the upper limit threshold THm or higher during the heating operation or the dehumidifying and heating operation, the air conditioning controller 32 executes a heating/waste heat recovery mode similar to that described above.

Further, when the first circulating pump 62 and the second circulating pump 63 are operated with the first three-way valve 81 switched to a state where the inlet and the one outlet communicate with each other, the second three-way valve 82 switched to a state where the inlet and the one outlet communicate with each other, the third three-way valve 83 switched to a state where the inlet and the other outlet communicate with each other, and further, the fourth three-way valve 84 switched to a state where the inlet and the one outlet communicate with each other, the heating medium discharged from the first circulating pump 62 flows through the heating medium pipe 68A, the first three-way valve 81, the heating medium pipe 68B, the battery 55, the heating medium pipe 68N, the fourth three-way valve 84, the heating medium pipe 68C, the second three-way valve 82, the heating medium pipe 68E, the heating medium flow passage 64A of the refrigerant-heating medium heat exchanger 64, and the heating medium pipe 68F in this order, and is sucked into the first circulating pump 62. On the other hand, the heating medium discharged from the second circulating pump 63 flows through the heating medium pipe 68G, the traveling motor 65, the heating medium pipe 68J, the third three-way valve 83, the heating medium pipe 68L, the air-heating medium heat exchanger 67, and the heating medium pipe 68M in this order, and is sucked into the second circulating pump 63, thereby performing circulation.

That is, as with the second flow passage control state of the first embodiment described above, the heating medium cooled by the refrigerant absorbing heat from the heating medium in the heating medium flow passage 64A of the refrigerant-heating medium heat exchanger 64 is circulated to the battery 55 and exchanges heat with the battery 55 to cool the battery 55, and the heating medium cooled by outdoor air (air-cooled) in the air-heating medium heat exchanger 67 is circulated to the traveling motor 65 and exchanges heat with the traveling motor 65 to cool the traveling motor 65.

This is similar to the second flow passage control state of the first embodiment, and this state is thus defined as the second flow passage control state also in this embodiment. Further, also in the equipment temperature adjusting device 61 of this embodiment, when the battery temperature Tb increases to the upper limit threshold THb or higher during the cooling operation or the dehumidifying and cooling operation, the air conditioning controller 32 executes a cooling/battery cooling and temperature-adjusted object cooling mode similar to that described above.

Further, in this embodiment, when the fourth three-way valve 84 is switched to a state where the inlet and the other outlet communicate with each other, and the first circulating pump 62 and the third circulating pump 87 are operated with the first three-way valve 81 switched to a state where the inlet and the other outlet communicate with each other, the second three-way valve 82 switched to a state where the inlet and the other outlet communicate with each other, and the third three-way valve 83 switched to a state where the inlet and the one outlet communicate with each other, the heating medium discharged from the first circulating pump 62 flows through the heating medium pipe 68A, the first three-way valve 81, the heating medium pipe 68D, the heating medium pipe 68C, the second three-way valve 82, the heating medium pipe 68H, the heating medium pipe 68G, the traveling motor 65, the heating medium pipe 68J, the third three-way valve 83, the heating medium pipe 68K, the heating medium pipe 68E, the heating medium flow passage 64A of the refrigerant-heating medium heat exchanger 64, and the heating medium pipe 68F in this order, and is sucked into the first circulating pump 62, thereby performing circulation. The heating medium discharged from the third circulating pump 87 flows through the heating medium pipe 68S, the heating medium heating heater 66, the heating medium pipe 68T, the heating medium pipe 68B, the battery 55, the heating medium pipe 68N, the fourth three-way valve 84, and the heating medium pipe 68R in this order, and is sucked into the third circulating pump 87, thereby performing circulation. This is defined as a third flow passage control state.

In the third flow passage control state, the heating medium is circulated between the traveling motor 65 and the refrigerant-heating medium heat exchanger 64. Thus, the heating medium cooled by the refrigerant absorbing heat from the heating medium in the heating medium flow passage 64A of the refrigerant-heating medium heat exchanger 64 is circulated to the traveling motor 65 and exchanges heat with the traveling motor 65 to recover waste heat from the traveling motor 65, and the traveling motor 65 itself is cooled. On the other hand, the heating medium is circulated between the battery 55 and the heating medium heating heater 66. Thus, when the heating medium heating heater 66 generates heat, the heating medium heated by the heating medium heating heater 66 is circulated to the battery 55, and the battery 55 is heated by the heating medium heating heater 66 through the heating medium.

(8) Heating/Battery Heating and Waste Heat Recovery Mode

Further, in this embodiment, the air conditioning controller 32 executes a heating/battery heating and waste heat recovery mode described below in the heating operation or the dehumidifying and heating operation described above. Next, the heating/battery heating and waste heat recovery mode will be described with reference to FIG. 9. As described above, the battery 55 is difficult to charge and discharge when the temperature thereof becomes extremely low, for example, under the extremely low temperature environment.

Figure 9:
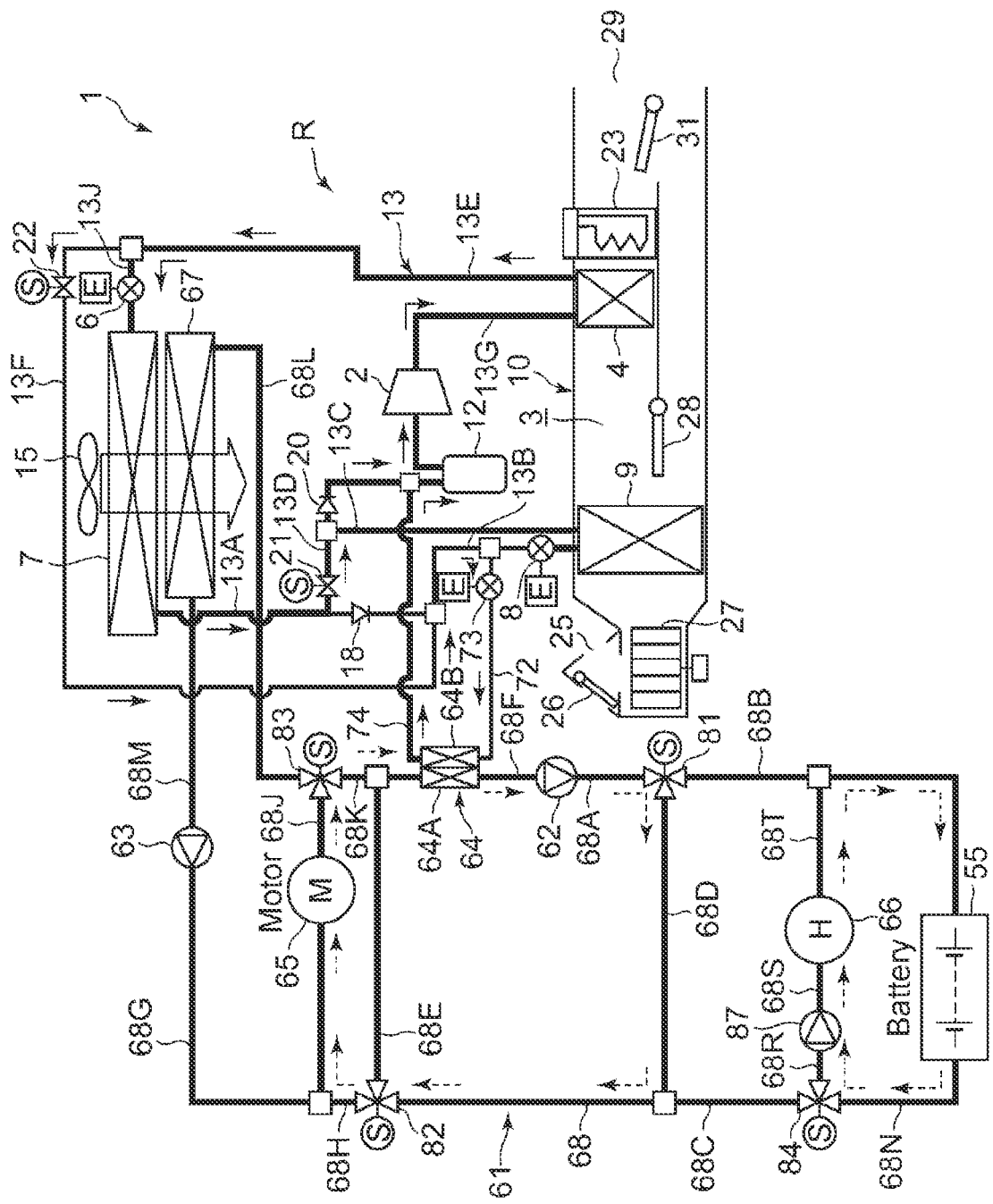
FIG. 9 is a diagram describing a heating/battery heating and waste heat recovery mode executed by an air conditioning controller in the vehicle air conditioning apparatus of FIG. 8.

Thus, for example, in the heating operation performed under the environment where the outdoor air temperature is extremely low, for example, in winter, when the battery temperature Tb detected by the battery temperature sensor 76 decreases to the above-mentioned lower limit threshold TLb or lower, the air conditioning controller 32 executes the heating/battery heating and waste heat recovery mode. FIG. 9 illustrates the flow (solid-line arrows) of the refrigerant of the refrigerant circuit R and the flow (broken-line arrows) of the heating medium of the equipment temperature adjusting device 61 in the heating/battery heating and waste heat recovery mode.

In the heating/battery heating and waste heat recovery mode, the air conditioning controller 32 further opens the solenoid valve 22 and also opens the auxiliary expansion valve 73 to control the opening degree thereof in the state of the heating operation of the refrigerant circuit R similar to the case illustrated in FIG. 3 of the first embodiment. Then, the air conditioning controller 32 controls the first to fourth three-way valves 81 to 84 of the equipment temperature adjusting device 61 to bring the flow of the heating medium inside the heating medium pipe 68 into the third flow passage control state described above, operates the first circulating pump 62 and the third circulating pump 87, and also energizes the heating medium heating heater 66 to cause the heating medium heating heater 66 to generate heat.

Consequently, similarly to the above, a part of the refrigerant flowing out of the radiator 4 is diverted on the refrigerant upstream side of the outdoor expansion valve 6 and reaches the refrigerant upstream side of the indoor expansion valve 8 through the refrigerant pipe 13F. The refrigerant then enters the branch pipe 72 and is decompressed in the auxiliary expansion valve 73, and then flows into the refrigerant flow passage 64B of the refrigerant-heating medium heat exchanger 64 through the branch pipe 72 and evaporates. At this time, the heat absorbing action is exhibited. The refrigerant evaporated in the refrigerant flow passage 64B sequentially flows through the refrigerant pipe 74, the refrigerant pipe 13C, and the accumulator 12, and is sucked into the compressor 2, thereby repeating circulation (indicated by the solid-line arrows in FIG. 9).

On the other hand, the heating medium discharged from the first circulating pump 62 flows through the heating medium pipe 68A, the first three-way valve 81, the heating medium pipe 68D, the heating medium pipe 68C, the second three-way valve 82, the heating medium pipe 68H, the heating medium pipe 68G, the traveling motor 65, the heating medium pipe 68J, the third three-way valve 83, the heating medium pipe 68K, the heating medium pipe 68E, the heating medium flow passage 64A of the refrigerant-heating medium heat exchanger 64, and the heating medium pipe 68F in this order, and is sucked into the first circulating pump 62, thereby repeating circulation. Further, the heating medium flowing out of the third circulating pump 87 flows through the heating medium pipe 68S, the heating medium heating heater 66, the heating medium pipe 68T, the heating medium pipe 68B, the battery 55, the heating medium pipe 68N, the fourth three-way valve 84, and the heating medium pipe 68R in this order, and is sucked into the third circulating pump 87, thereby performing circulation (indicated by the broken-line arrows in FIG. 9: the third flow passage control state).

Thus, the heating medium cooled by the refrigerant absorbing heat from the heating medium in the heating medium flow passage 64A of the refrigerant-heating medium heat exchanger 64 is circulated to the traveling motor 65 and exchanges heat with the traveling motor 65 to recover waste heat from the traveling motor 65 and cool the traveling motor 65. The waste heat recovered from the traveling motor 65 is absorbed by the refrigerant in the refrigerant-heating medium heat exchanger 64 and contributes to heating inside the cabin in the radiator 4. Further, the heating medium flowing out of the heating medium flow passage 64A of the refrigerant-heating medium heat exchanger 64 is not circulated to the battery 55, and, instead, the heating medium heated by the heating medium heating heater 66 is circulated to the battery 55. The battery 55 is heated by the heating medium heating heater 66 through the heating medium, which increases the temperature of the battery 55.

Note that, for example, when the battery temperature Tb detected by the battery temperature sensor 76 increases to the above-mentioned upper limit threshold THb or higher, the air conditioning controller 32 finishes the heating/battery heating and waste heat recovery mode. In this manner, the temperature of the battery 55 is maintained within the above-mentioned appropriate temperature range. Further, the air conditioning controller 32 executes a heating/battery heating and waste heat recovery mode similar to that in the heating operation described above also in the dehumidifying and heating operation. Also in this case, the auxiliary expansion valve 73 is opened in the state of FIG. 4 to divert a part of the refrigerant flowing into the refrigerant pipe 13B to the branch pipe 72. Then, the diverted refrigerant absorbs heat from the heating medium in the refrigerant-heating medium heat exchanger 64 and is then sucked into the compressor 2 as with the case of FIG. 9.

In this manner, the equipment temperature adjusting device 61 is provided with the heating medium heating heater 66 for heating the battery 55. Further, the air conditioning controller 32 has the heating/battery heating and waste heat recovery mode for cooling the traveling motor 65 using the refrigerant and heating the battery 55 using the heating medium heating heater 66 in the heating operation or the dehumidifying and heating operation. Thus, in particular, under the low outdoor air temperature environment, it is also possible to eliminate the inconvenience of reduction in performance caused by excessive decrease in the temperature of the battery 55 while cooling the traveling motor 65 and recovering waste heat thereof.

In this case, in the embodiment, when the battery temperature Tb detected by the battery temperature sensor 76 decreases to the lower limit threshold TLb or lower, the air conditioning controller 32 executes the heating/battery heating and waste heat recovery mode. Thus, it is possible to appropriately start the heating/battery heating and waste heat recovery mode for heating the battery 55 while recovering waste heat from the traveling motor 65.

Further, in the embodiment, the equipment temperature adjusting device 61 is provided with the first circulating pump 62, the second circulating pump 63, and the third circulating pump 87 for circulating the heating medium to the battery 55, the traveling motor 65, and the heating medium heating heater 66, the refrigerant-heating medium heat exchanger 64 for exchanging heat between the refrigerant and the heating medium, and the first to fourth three-way valves 81 to 84 for controlling the circulation of the heating medium to the battery 55, the traveling motor 65, and the heating medium heating heater 66. In the heating/battery heating and waste heat recovery mode, the air conditioning controller 32 decompresses the refrigerant and then passes the refrigerant to the refrigerant-heating medium heat exchanger 64 to cause the refrigerant to absorb heat from the heating medium, circulates the heating medium flowing out of the refrigerant-heating medium heat exchanger 64 to the traveling motor 65 without circulating the heating medium to the battery 55, and circulates the heating medium between the heating medium heating heater 66 and the battery 55 to heat the battery 55. Thus, it is possible to smoothly achieve an operation of heating the battery 55 while cooling the traveling motor 65 and recovering waste heat thereof.

Note that, in the embodiment, the equipment temperature adjusting device 61 is switched between the first to third flow passage control states to enable execution of the respective operation modes: the heating/waste heat recovery mode, the cooling/battery cooling and temperature-adjusted object cooling mode, and the heating/battery heating and waste heat recovery mode, the present disclosure is not limited thereto. For example, in the circuit of FIG. 3, when the first circulating pump 62 is operated with the first three-way valve 81 switched to a state where the inlet and the one outlet communicate with each other and the second three-way valve 82 switched to a state where the inlet and the other outlet communicate with each other, the heating medium discharged from the first circulating pump 62 flows through the heating medium pipe 68A, the first three-way valve 81, the heating medium pipe 68B, the battery 55, the heating medium pipe 68C, the second three-way valve 82, the heating medium pipe 68H, the heating medium pipe 68G, the traveling motor 65, the heating medium pipe 68J, the third three-way valve 83, the heating medium pipe 68K, the heating medium pipe 68E, the heating medium flow passage 64A of the refrigerant-heating medium heat exchanger 64, and the heating medium pipe 68F in this order, and is sucked into the first circulating pump 62, thereby performing circulation.

Circulating the heating medium inside the equipment temperature adjusting device 61 in this manner allows the heating medium to circulate between the battery 55 and the refrigerant-heating medium heat exchanger 64 and between the traveling motor 65 and the refrigerant-heating medium heat exchanger 64. Thus, the heating medium cooled by the refrigerant absorbing heat from the heating medium in the heating medium flow passage 64A of the refrigerant-heating medium heat exchanger 64 is circulated to the battery 55 and the traveling motor 65 and exchanges heat with the battery 55 and the traveling motor 65 to recover heat from the battery 55 and the traveling motor 65, and the battery 55 and the traveling motor 65 themselves are cooled.

In this manner, it is also possible to simultaneously circulate the heating medium cooled in the refrigerant-heating medium heat exchanger 64 to the battery 55 and the traveling motor 65 to cool the battery 55 and the traveling motor 65. Thus, for example, when the temperature of the battery 55 is extremely high even in winter, it is also possible to simultaneously cool the battery 55 and the traveling motor 65 and recover waste heat thereof.

That is, as described above, the equipment temperature adjusting device 61 for adjusting the temperature of the battery 55 and the temperature of the traveling motor 65 (the temperature-adjusted object other than the battery) is provided, and the equipment temperature adjusting device 61 is provided with the first to third circulating pumps 62, 63, and 87 for circulating the heating medium to the battery 55 and the traveling motor 65, the refrigerant-heating medium heat exchanger 64 for exchanging heat between the refrigerant and the heating medium to cause the refrigerant to absorb heat from the heating medium, the air-heating medium heat exchanger 67 for exchanging heat between outdoor air and the heating medium, and the first to fourth three-way valves 81 to 84 for controlling the circulation of the heating medium to the battery 55 and the traveling motor 65. This makes it possible to cool, in various manners, the battery 55 and the temperature-adjusted object other than the battery 55, such as the traveling motor 65, the battery 55 and the traveling motor 65 being mounted on the vehicle, using the heating medium cooled by the refrigerant in the refrigerant-heating medium heat exchanger 64 and the heating medium cooled by outdoor air in the air-heating medium heat exchanger 67 by the air conditioning controller 32 controlling the first to third circulating pumps 62, 63, and 87, and the first to fourth three-way valves 81 to 84, which results in enhanced convenience.

Further, it is needless to say that the configuration of the air conditioning controller 32, and the configurations of the refrigerant circuit R and the equipment temperature adjusting device 61 of the vehicle air conditioning apparatus 1 described in the embodiments are not limited thereto and can be changed without departing from the gist of the present invention.

LIST OF THE REFERENCE NUMERALS

1 Vehicle air conditioning apparatus
2 Compressor
4 Radiator
6 Outdoor expansion valve
7 Outdoor heat exchanger
8 Indoor expansion valve
9 Heat absorber
21, 22 Solenoid valve
32 Air conditioning controller (control device)
55 Battery
61 Equipment temperature adjusting device
62 First circulating pump (circulating device)
63 Second circulating pump (circulating device)
64 Refrigerant-heating medium heat exchanger
65 Traveling motor (temperature-adjusted object)
66 Heating medium heating heater (heating device)
67 Air-heating medium heat exchanger
72 Branch pipe
73 Auxiliary expansion valve
81 First three-way valve (flow passage switching device)
82 Second three-way valve (flow passage switching device)
86 Third three-way valve (flow passage switching device)
84 Fourth three-way valve (flow passage switching device)
87 Third circulating pump (circulating device)

What is claimed is:

1. A vehicle air conditioning apparatus for air-conditioning inside of a cabin, the vehicle air conditioning apparatus comprising:
a compressor for compressing a refrigerant;
a radiator for causing the refrigerant to dissipate heat to heat air to be supplied into the cabin;
a heat absorber for causing the refrigerant to absorb heat to cool air to be supplied into the cabin;
an outdoor heat exchanger provided outside the cabin;
a control device; and
an equipment temperature adjusting device for circulating a heating medium to a battery and a predetermined temperature-adjusted object other than the battery, the battery and the temperature-adjusted object being mounted on a vehicle, to adjust a temperature of the battery and a temperature of the temperature-adjusted object, wherein
the equipment temperature adjusting device includes:
a circulating device for circulating the heating medium to the battery and the temperature-adjusted object;
a refrigerant-heating medium heat exchanger for exchanging heat between the refrigerant and the heating medium to cause the refrigerant to absorb heat from the heating medium;
an air-heating medium heat exchanger for exchanging heat between outdoor air and the heating medium; and
a flow passage switching device for controlling circulation of the heating medium to the battery and the temperature-adjusted object, and
the control device is capable of executing a first flow passage control state for circulating the heating medium flowing out of the refrigerant-heating medium heat exchanger to the temperature-adjusted object without circulating the heating medium to the battery and
a second flow passage control state for circulating the heating medium between the battery and the refrigerant-heating medium heat exchanger and circulating the heating medium between the temperature-adjusted object and the air-heating medium heat exchanger in a switching manner
by controlling the circulating device and the flow passage switching device.

2. The vehicle air conditioning apparatus according to claim 1, wherein
the equipment temperature adjusting device includes a heating device for heating the heating medium, and
the control device is capable of executing a third flow passage control state for circulating the heating medium between the battery and the heating device and circulating the heating medium between the temperature-adjusted object and the refrigerant-heating medium heat exchanger in a switching manner
by using the circulating device and the flow passage switching device.

3. A vehicle air conditioning apparatus for air-conditioning inside of a cabin, the vehicle air conditioning apparatus comprising:
a compressor for compressing a refrigerant;
a radiator for causing the refrigerant to dissipate heat to heat air to be supplied into the cabin;
a heat absorber for causing the refrigerant to absorb heat to cool air to be supplied into the cabin;
an outdoor heat exchanger provided outside the cabin;
a control device; and
an equipment temperature adjusting device for circulating a heating medium to a battery and a predetermined temperature-adjusted object other than the battery, the battery and the temperature-adjusted object being mounted on a vehicle, to adjust a temperature of the battery and a temperature of the temperature-adjusted object, wherein
the equipment temperature adjusting device includes:
a circulating device for circulating the heating medium to the battery and the temperature-adjusted object;
a refrigerant-heating medium heat exchanger for exchanging heat between the refrigerant and the heating medium to cause the refrigerant to absorb heat from the heating medium;
an air-heating medium heat exchanger for exchanging heat between outdoor air and the heating medium; and
a flow passage switching device for controlling circulation of the heating medium to the battery and the temperature-adjusted object,
the control device is capable of executing at least an air conditioning operation for heating the inside of the cabin by causing the refrigerant discharged from the compressor to dissipate heat in the radiator, decompressing the refrigerant heat-dissipated, and then causing the refrigerant to absorb heat in the outdoor heat exchanger and
an air conditioning operation for cooling the inside of the cabin by causing the refrigerant discharged from the compressor to dissipate heat in the outdoor heat exchanger, decompressing the refrigerant heat-dissipated, and then causing the refrigerant to absorb heat in the heat absorber in a switching manner, and
the control device is capable of decompressing the refrigerant and then passing the refrigerant to the refrigerant-heating medium heat exchanger to cause the refrigerant to absorb heat from the heating medium in each of the air conditioning operations.

* * * * *